US010211588B2

(12) United States Patent
Hunter, Jr.

(10) Patent No.: US 10,211,588 B2
(45) Date of Patent: Feb. 19, 2019

(54) OPTICAL CONFIGURATIONS FOR FUSION LASER

(71) Applicant: INNOVEN ENERGY LLC, Colorado Springs, CO (US)

(72) Inventor: Robert O. Hunter, Jr., Colorado Springs, CO (US)

(73) Assignee: Innoven Energy LLC, Colorado Springs, CO (US)

( * ) Notice: Subject to any disclaimer, the term of this patent is extended or adjusted under 35 U.S.C. 154(b) by 0 days.

(21) Appl. No.: 15/825,413

(22) Filed: Nov. 29, 2017

(65) Prior Publication Data
US 2018/0159290 A1 Jun. 7, 2018

Related U.S. Application Data

(60) Provisional application No. 62/497,908, filed on Dec. 6, 2016.

(51) Int. Cl.
| | |
|---|---|
| H01S 3/00 | (2006.01) |
| H01S 3/102 | (2006.01) |
| H01S 3/094 | (2006.01) |
| H01S 3/108 | (2006.01) |
| H01S 3/08 | (2006.01) |
| H01S 3/10 | (2006.01) |
| G21B 1/23 | (2006.01) |
| H01S 3/23 | (2006.01) |
| H01S 3/30 | (2006.01) |
| G21B 1/03 | (2006.01) |

(52) U.S. Cl.
CPC .............. *H01S 3/0057* (2013.01); *G21B 1/23* (2013.01); *H01S 3/0092* (2013.01); *H01S 3/0805* (2013.01); *H01S 3/094061* (2013.01); *H01S 3/1024* (2013.01); *H01S 3/10084* (2013.01); *H01S 3/1086* (2013.01); *G21B 1/03* (2013.01); *H01S 3/005* (2013.01); *H01S 3/0071* (2013.01); *H01S 3/2383* (2013.01); *H01S 3/30* (2013.01)

(58) Field of Classification Search
CPC ...... H01S 3/0623; H01S 3/137; H01S 3/1305; H01S 3/08009; H01S 3/10084; H01S 3/1086; G21B 1/03
USPC ....................................................... 372/20, 3
See application file for complete search history.

(56) References Cited

U.S. PATENT DOCUMENTS

| | | | | |
|---|---|---|---|---|
| 4,264,869 A | * | 4/1981 | Hunter .................. | H01S 3/0057 359/342 |
| 4,337,437 A | * | 6/1982 | Hunter ..................... | G21B 1/23 359/349 |
| 2018/0123314 A1 | * | 5/2018 | Hunter, Jr. ............ | H01S 3/2391 |

OTHER PUBLICATIONS

Sawicki, The National Ignition Facility: Laser System, Beam Line Design and Construction, Optical Engineering at the Lawrence Livermore Laboratory II: The National Ignition Facility, Proceedings of SPIE, 2004, vol. 5341, pp. 43-53.

(Continued)

*Primary Examiner* — Tuan Nguyen

(57) ABSTRACT

Embodiments include an optical configuration of a laser for driving an inertial confinement target that may include a section configured to generate long pulse laser light (Primary Laser Source) and then to compress the long pulse with multiple compression stages to a desired pulse length, energy, and beam quality (Compression Section). These configurations can utilize compression stages that do not include any material optics operating near damage fluence, and that do not require material optics exposed to high fluences to couple compression stages to each other.

14 Claims, 19 Drawing Sheets

(56) References Cited

OTHER PUBLICATIONS

Campbell et al., NIF Optical Materials and Fabrication Technologies: An Overview, Optical Engineering at the Lawrence Livermore National Laboratory II: The National Ignition Facility, Proceedings of SPIE, 2004, vol. 5341, pp. 84-101.
Moyer, Fusion's False Dawn, in Scientific American, Nature Publishing Group, Mar. 2010, pp. 50-57.
Rosocha et al., Excimer Lasers for ICF, in Nuclear Fusion by Inertial Confinement: A Comprehensive Treatise, 1993, CRC Press, Inc., Ch. 15, pp. 371-420.
Velarde et al., Solid-State Lasers for ICF, in Nuclear Fusion by Inertial Confinement: A Comprehensive Treatise, CRC Press, Inc., 1993, Ch. 14, pp. 351-370.
Mcrory, Laser-Driven ICF Experiments, in Nuclear Fusion by Inertial Confinement: A Comprehensive Treatise, CRC Press, Inc., 1993, Ch. 22, pp. 371-420.
Averbakh et al., Stimulated Molecular Scattering of Light in Gases at Different Pressures, Soviet Journal of Quantum Electronics, 1976, vol. 5, No. 10, pp. 1201-1206.
Kaiser et al., High Damage Threshold A12O3 Coatings for Excimer Lasers, Thin Solid Films 260, 1995, pp. 86-92.
Ewing et al., Optical Pulse Compressor Systems for Laser Fusion, IEEE Journal of Quantum Electronics, vol. QE-15, No. 5, May 1979, pp. 368-379.
Damzen et al., High-Efficiency Laser Pulse Compression by Stimulated Brillouin Scattering, Optic Letters, 1983, vol. 8, No. 6, pp. 313-315.
Murray et al., Raman Pulse Compression of Excimer Lasers for Applications to Laser Fusion, IEEE Journal of Quantum Electronics, May 1979, vol. QE-15, No. 5, pp. 342-368.
Shaw et al., Ultrahigh-Brightness KrF Laser System for Fast Ignition Studies, Fusion Engineering and Design, 44, 1999, pp. 209-214.
Herring et al., Model of the Rotational Raman Gain Coefficients for N2 in the Atmosphere, Applied Optics, Aug. 1987, vol. 26, No. 15, pp. 2988-2994.
Johnson et al., Physics of the Krypton Fluoride Laser, Journal of Applied Physics, May 1980, vol. 51, No. 5, pp. 2406-2420.
Damzen et al., Laser Pulse Compression by Stimulated Brillouin Scattering in Tapered Waveguides, IEEE Journal of Quantum Electronics, Jan. 1983, vol. QE-19, No. 1, pp. 7-14.
Snitzer, Glass Lasers, Applied Optics 1966 vol. 5, No. 10, pp. 1487-1499.
Shaw et al., Measurement of the Nonlinear Refractive Index of Air and Other Gases at 248 nm, Optics Communications, 1993, vol. 103, pp. 153-160.
Pasmanik, Self-Interaction of Incoherent Light Beams, Soviet Physics JETP, 1974, vol. 39, No. 2, pp. 234-238.
Hooker et al., Novel Four-Wave Mixing Phenomenon in a Raman Amplifier, Physical Review Letters, 1995, vol. 74, No. 21, pp. 4197-4201.
Partanen et al., High-Power Forward Raman Amplifiers Employing Low-Pressure Gases in Light Guides: I, Theory and Applications, Journal of the Optical Society of America B, 1986, vol. 3, No. 10, pp. 1374-1387.
Shaw et al., High-Power Forward Raman Amplifiers Employing Low-Pressure Gases in Light Guides: II, Experiments, Journal of the Optical Society of America B, 1986, vol. 3, No. 10, pp. 1466-1475.
Cartwright, Inertial Confinement Fusion at Los Alamos, Los Alamos National Laboratory, Sep. 1989, LA-UR-89-2675-1.
Kurnit, Nonlinear Pulse Compression, Inertial Confinement Fusion at Los Alamos, 1989, vol. 1, Ch. VII, pp. 1-2.
Hunter et al., Single Pulse Excimer Ground Based Laser ASAT Concept Definition Study, Thermo Electron Technologies Corporation, Oct. 25, 1989, TTC-1588-r.
Hunter et al., Key Technical Issues Associated with a Method of Pulse Compression, U.S. Department of Energy, 1980, DOE/DP/40107-1.
Bloembergen et al., Report to the American Physical Society of the Study Group on Science and Technology of Directed Energy Weapons, Review of Modern Physics, Jul. 1987, vol. 59, No. 3, Part II, pp. S1-S201.
Pauling, General Chemistry, W.H. Freeman (Ed.), 1988 Dover Publications, Inc.
Gavrila, Atoms in Intense Laser Fields, Academic Press, 1992, New York.
Lin et al., Multiphoton Spectroscopy of Molecules, Academic Press, Inc. 1984, Orlando, FL.
Lowenthal et al., Conceptual Design of an Angular Multiplexed 50 kJ KrF Amplifier for ICF, IEEE Journal of Quantum Electronics, Sep. 1981, vol. QE-17, No. 9, pp. 1861-1870.
Lowenthal et al., ASE Effects in Small Aspect Ratio Laser Oscillators and Amplifiers with Nonsaturable Absorption, IEEE Journal of Quantum Electronics, Aug. 1986, vol. QE-22, No. 8, pp. 1165-1173.
Tomov et al., High-Efficiency Stimulated Brillouin Scattering of KrF Laser Radiation in SF6, Optics Letters, Sep. 1984, vol. X, No. 9, pp. 405-407.
Murray et al., Large-Signal Gain and Intensity Enhancement in a Backward Raman Amplifier, Applied Physics Letters, Sep. 1978, vol. 33, No. 5, pp. 399-401.
Gower, KrF Laser-Induced Breakdown of Gases, Optics Communications, Jan. 1981, vol. 36, No. 1, pp. 43-45.
Turcu et al., Measurement of KrF Laser Breakdown Threshold in Gases, Optics Communications, 1997, 134, pp. 66-68.
Takahashi et al., Compression of High Power KrF Laser Pulse by Backward Raman Amplification, Fusion Engineering and Design, 1999, 44, pp. 133-136.
Ross et al., A High Performance Excimer Pumped Raman Laser, Optics Communications, Sep. 1990, vol. 78, No. 34, pp. 263-270.
Hooker et al., Multiplexed Short-Pulse Amplification in a KrF Laser, Optics Communications, Feb. 1999, vol. 65, No. 4, pp. 269-274.
Hagenlocker et al., Effects of Phonon Lifetime on Stimulated Optical Scattering in Gases, Physical Review, Feb. 1967, vol. 154, No. 2, pp. 226-234.
Minck et al., Simultaneous Occurrence of and Competition Between Stimulated Optical-Scattering Processes in Gasses, Journal of Applied Physics, Apr. 1967, vol. 38, No. 5, pp. 2254-2260.
Herring et al., Temperature and Wavelength Dependence of the Rotational Raman Gain Coefficient in N2, Optics Letters, Jun. 1986, vol. 11, No. 6, pp. 348-350.
Henesian et al., Stimulated Rotational Raman Scattering in Nitrogen in Long Air Paths, Optics Letters, Nov. 1985, vol. 10, No. 11, pp. 565-567.
Morgan et al., Laser Beam Induced Breakdown in Helium and Argon, Journal of Physics D: Applied Physics, 1971, vol. 4, pp. 225-235.
Herring et al., Temperature and Density Dependence of the Linewidths and Line Shifts of the Rotational Raman Lines in N2 and H2, Physical Review A, Sep. 1986, vol. 34, No. 3, pp. 1944-1951.
Bischel et al., Wavelength Dependence of Raman Scattering Cross Sections from 200-600 NM, AIP Conference Proceedings, No. 100, Subseries on Optical Science and Engineering, 1983, No. 3, Excimer Lasers, pp. 181-187.
Hunter et al., Scaling of KrF Laser for Inertial Confinement Fusion, IEEE Journal of Quantum Electronics, vol. QE-22, No. 386.
Murray et al., Experimental Observation and Suppression of Transverse Stimulated Brillouin Scattering in Large Optical Components, Journal of the Optical Society of America B, Dec. 1989, vol. 6, No. 12, pp. 2402-2411.
Smith, Single Cross Beam Conversion (RPT-AS-20140826, Innoven Energy LLC, 2014).
Hunter, ASE Suppression (RPT-ROH-20150625, Innoven Energy LLC, 2015).

* cited by examiner

OPTICAL CONFIGURATIONS FOR FUSION LASER

CROSS-REFERENCE TO RELATED APPLICATION

This application claims priority to U.S. Provisional Patent Application Ser. No. 62/497,908 titled "Optical Configurations for Fusion Laser" filed on Dec. 6, 2016, and hereby incorporated by reference.

BACKGROUND

This invention relates to a new design for lasers. A major application is a low-cost driver for inertial confinement fusion (ICF) as an energy source, and more particularly, for providing the required very large laser energy in a short optical pulse at low cost.

Over the past approximately 45 years, a substantial effort has been generally directed towards obtaining thermonuclear fusion energy from targets irradiated by various types of particle beams. Lasers, particularly those with short wavelength light (0.25-0.5 microns), have generally emerged as the main contender for producing ignition (substantially more fusion energy out than the energizing beam puts in). The glass laser, where the laser energy is stored in a solid doped crystalline or glass medium and then extracted in a short pulse, has generally been the primary type of laser used in investigations to date (see, for an example of a general description, E. Snitzer, "Glass Lasers," *Applied Optics*, Vol. 5, No. 10, pp. 1487-1499, 1966, incorporated by reference herein for all purposes). The United States has generally supported the construction and operation of a National Ignition Facility (NIF). This laser uses Nd:glass (discovered in 1961) for the storage medium and should produce about 2 megajoules of laser light at a wavelength of 0.35 microns that is ⅓ the wavelength of the fundamental Nd frequency in a pulse length of approximately $10^{-8}$ seconds (see, for example, "The National Ignition Facility: Laser System, Beam Line Design and Construction," by R. H. Sawicki, in M. A. Lane and C. R. Wuest (Eds.), *Optical Engineering at the Lawrence Livermore National Laboratory II: The National Ignition Facility, Proceedings of SPIE*, Vol. 5341, 2004, pp. 43-53, incorporated by reference herein for all purposes). The $4 to $5 Billion Dollar cost of the facility is generally leading to a cost per joule of laser energy on the order or in excess of $2,000/joule. The efficiency and repetition rate may not be suitable for commercialization. In addition, the provision of such energies is limited in pulse length for pulses in the $10^{-9}$ second range, although a shorter pulse length may be desirable for some targets. For a summary of thermonuclear fusion efforts (see, for example, M. Moyer, "Fusion's False Dawn," *Scientific American*, March, pp. 50-57, 2010, incorporated by reference herein for all purposes). Thus, improved lasers for ICF would be beneficial, both in terms of speeding up the development cycle and eventual commercialization.

An alternative approach to such short pulse lasers may be to use long laser pulses that are then time compressed. Many people have generally discussed overall architectures for pulse compression of efficiently generated long laser pulses, particularly those using the krypton fluoride laser (discovered in 1975) with various compression techniques. Pure angular multiplexing received substantial attention, in part due to its conceptual simplicity and potential for a factor on the order of 10 in cost reduction compared to the glass laser technology (see, for example, R. O. Hunter, Jr., and D. L. Fried, "High Energy Laser," U.S. Pat. No. 4,337,437, Jan. 29, 1982; R. O. Hunter, Jr., "Compressed Pulse Laser," U.S. Pat. No. 4,264,869, Apr. 28, 1981; R. O. Hunter, Jr., et al., "Key Technical Issues Associated With A Method Of Pulse Compression," U.S. Department of Energy, DOE/DP/40107-1, 1980, "Excimer Lasers for ICF," by L. A. Rosocha, S. J. Dzuchlewski, B. J. Krohn and J. McLeod, in *Nuclear Fusion by Inertial Confinement: A Comprehensive Treatise*, by G. Velarde, Y. Ronen and J. M. Martinez-Val (Eds), CRC Press, Inc., 1993, Chapter 15, pp. 371-420, incorporated by reference herein for all purposes).

In addition to, or in conjunction with, angular multiplexing, the uses of stimulated scattering processes for proposed large-scale applications, particularly Raman and Brillouin scattering for pulse compression, were generally developed later than the glass laser technology for ICF. In various combinations with pure multiplexing, for example, they were shown to time compress krypton fluoride light for the ICF application at small scale (see, for example, M. J. Shaw, J. P. Partanen, Y. Owadano, I. N. Ross, E. Hodgson, C. B. Edwards and F. O'Neill, "High-Power Forward Raman Amplifiers Employing Low-Pressure Gases in Light Guides: II. Experiments," *Journal of the Optical Society of America B*, Vol. 3, No. 10, pp. 1466-1475, 1986, incorporated by reference herein for all purposes).

In addition, Raman scattering was generally demonstrated as a technique to combine separate apertures to provide near diffraction-limited output at large scale for non-ICF applications (see, for example, A. Hunter and G. Houghton, "Single Pulse Excimer Ground Based Laser ASAT Concept Definition Study," Thermo Electron Technologies Corporation, TTC-1588-R, 1989, incorporated by reference herein for all purposes; and N. Bloembergen et al., "Report to The American Physical Society of the Study Group on Science and Technology of Directed Energy Weapons," *Reviews of Modern Physics*, Vol. 59, No. 3, Part II, pp. S1-S201, 1987, incorporated by reference herein for all purposes). In previous architectures for ICF, the stimulated scattering was generally not used to replace reflective elements or to provide reflectivities at very high fluence, only to time compress pulses in geometries where material mirrors controlled the input and output from the scattering region(s). Thus, the architectures were generally limited by the properties of the optical elements in terms of handling the inputs and outputs for the compression regions (see, for example, J. J. Ewing et al., "Optical Pulse Compressor Systems for Laser Fusion," *IEEE Journal of Quantum Electronics*, Vol. QE-15, No. 5, pp. 368-379, 1979, incorporated by reference herein for all purposes, and M. J. Damzen and H. Hutchinson, "High-efficiency Laser Pulse Compression by Stimulated Brillouin Scattering," *Optics Letters*, Vol. 8, No. 6, pp. 313-315, 1983, incorporated by reference herein for all purposes). Since the cost of large-scale systems may depend markedly on the overall optical area, the higher the operating fluences on the optical surfaces and the lower the number of optical surfaces, the lower the cost of the compression step. In addition, the material window regions between the vacuum of the target region and the laser region may pose limitations due to their damage properties.

In some cases, the solid state lasers for ICF may have been strongly limited by the damage fluence in the glass storage media itself as well as in the beam handling optics. In addition to the damage fluence, other parameters, such as the nonlinear index of refraction, may be superior for certain embodiments described herein from a laser design standpoint. Also, some preferred architectures for ICF lasers based on such storage media entail generating a short pulse of light of the desired optical pulse length ($\approx 10^{-8}$-$10^{-9}$ seconds) at an infrared wavelength (1.06 microns) and then utilizing a frequency tripling technique in solid materials to convert the laser light to an ultraviolet wavelength (0.35 microns) more desirable for target coupling. NIF utilizes such an architecture. The conversion elements may be subject to damage fluence limitations as well. Characteristically, the damage fluences in the ultraviolet are on the order of 1-10 joules/cm$^2$ for such ultraviolet light with a pulse length of about $10^{-8}$ seconds.

In a previous assessment of designs associated with nonlinear scattering techniques for pulse compression as applied to ICF, the following quotes were given:

1) "Nonlinear schemes have the advantages of allowing for beam cleanup, accommodating a combination of pump beams, and reducing the requirements on the optical beam quality of the pump pulse. However, Raman compression suffers from inefficient conversion of the pump pulse into the compressed pulse and limited power and intensity gains. Typically, the compression ratio for backward Raman is limited to less than 5 at 50% conversion efficiency, due to parasitic depletion of the medium by the second Stokes-shifted pulse. The efficiency can be increased, but the compression ratio must be lowered in the process. Therefore, to use Raman compression efficiently, it must be combined with multiplexing to get a high compression ratio. For short pulses, Brillouin compression does not exhibit the limitations of Raman compression for power gain and efficiency. Typical experimental results show efficiencies of 40 to 80% and compression ratios of 2 to 80; however, the bandwidth is even narrower than it is with Raman compression. Therefore, SBS compression for KrF laser beams may be more promising in reducing the number of beamlines, although the broad bandwidth advantages are not retained. However, modeling of SBS converters have shown this process to be incompatible with pump duration longer than ~50 nsec, making it unsuitable as a substitute for angular multiplexing.

Hybrid schemes, involving combinations of multiplexing and Raman or Brillouin compression, have been invented in attempts to design scalable systems which incorporate the best features of both multiplexing and nonlinear compression. However, so far these schemes have not proven to be simpler, more efficient, more economical, or more readily scalable than multiplexing" (L. A. Rosocha, supra, p. 2).

2) "In view of the recommendations made last year in the report of the DOE KrF Panel, it appears that some elaboration of our reasons for rejection of nonlinear optical pulse compression techniques in favor of optical angular multiplexing is appropriate here. This decision is largely based on the conclusion that for large systems, the size of individual optics downstream from the final amplifiers is already sufficiently large that using nonlinear optics to compress the energy in larger time slots or to combine the outputs of several amplifiers does not result in any cost savings. Furthermore, there are efficiency losses in any nonlinear conversion process, and the process requires additional optical elements that increase the cost. Finally, the nonlinear techniques impose severe constraints on the bandwidth that can be compressed and thus do not provide the bandwidth flexibility that is believed to be desirable for an ICF facility. Although detailed designs have not been done in the context of the LMF, it appears that the following considerations make nonlinear pulse compression techniques noncompetitive with angular multiplexing. These considerations were discussed at the KrF Workshop held in Santa Fe in April 1989. There appeared to be general agreement among representatives all of the major laboratories that have addressed these issues in KrF that, although nonlinear compression techniques might present some cost savings in relatively small, short-pulse systems that would otherwise require a large number of beamlets, there were no obvious cost savings in large systems and no workable methods for achieving large bandwidths, aside from the possibility of generating a comb of multiple narrow frequencies in the front end to drive different amplifiers and Raman cells. We believe this adds unnecessary complexity and may not have as beneficial effect as a truly broadband source." (N. A. Kurnit, "Nonlinear Pulse Compression," *Inertial Confinement Fusion at Los Alamos*, Vol. 1, Ch. VII, pp. 1-2, 1989, incorporated by reference herein for all purposes.)

SUMMARY

Some embodiments are directed to a laser architecture that addresses many of the above aspects. Features may include the use of optical compression techniques to transform a long laser pulse length ($\approx 10$ seconds, for example) optical output that can be generated at low cost into a short pulse length ($10^{-8}$-$10^{-9}$ seconds) beam at very low cost by avoiding the use of optical surfaces that may be exposed to damaging optical fluences such as those in excess of 1 joule/cm$^2$ in a $10^{-9}$ second pulse length at the laser wavelength of 0.25 microns. Optical elements may be damaged when exposed to such light at such an energy/area (fluence) due to irreversible damage to the surface coating and/or underlying substrate material. Such a damage fluence is generally a function of the laser wavelength and optical pulse length and arises from a variety of complicated phenomena. Such damage limitations may be overcome for many embodiments by directly coupling the output of one stage to pump the next stage in the compression process.

Some embodiments may produce many colors (separate frequencies) by having different frequency shifts in a given stage. Since some embodiments have multiple parallel elements forming a stage, the separate elements may be driven by different colors from the previous stage and/or may have different scattering frequency shifts for the separate elements. Also, a given element may be operated with multiple color outputs with a single color pump input (for example, the S(6), S(8), S(10), S(12), and S(14) rotational transitions in N$_2$ at 1 amagat have gain coefficients fairly close to each other as shown in "Model of the Rotational Raman Gain Coefficients for N$_2$ in the Atmosphere," by G. C. Herring and W. K. Bischel, *Applied Optics*, Vol. 26, No. 15, 1 pp. 2988-2994, 1987, incorporated by reference herein for all purposes and so could possibly operate simultaneously and may produce 5 different colors for a single drive color. By color shifting the output of one stage as it drives the next, many different color combinations may be produced as well.

For many ICF target concepts, a broad frequency spectrum may be desirable in terms of ameliorating the difficulties encountered in coupling to the target, including stimulated scattering in the absorption region leading to hot electrons that may deleteriously preheat the fuel section and/or target plasmas that reflect the light instead of absorbing it. In addition, the uniformity of illuminating many regions simultaneously from many output elements of a stage may lead to very improved illumination uniformity.

The architectures discussed herein may lend themselves to producing laser light frequencies across a broad spectrum and consequent superior target coupling by adding the many colors together in a common focal region. Usually, multiple colors may impose a substantial burden in terms of cost and complexity in the optical element due to the need to optimize coatings and material for a given color. Since the large optical areas are reduced by directly pumping the next stage without introducing permanent surfaces exposed to high optical fluence, this burden may be lessened. In addition, the high stage gains ($10^3$-$10^4$) some embodiments exhibit greatly reduced drive complexity. The same comment may also apply to polarization as various polarization combinations may be propagated through the same gas region in some embodiments and the specialty coatings would only be required in the low power sections. In glass laser systems, coatings and/or surfaces (such as being set at a fixed angle to propagate one linear polarization with low loss, but having high losses for the other) may be suitable for a restricted set of polarizations. Again, with this architecture, colors and/or polarizations may be readily switched without incurring such losses. Consequently, the architectures may be much more flexible.

Some embodiments relate to taking laser light generated at a longer pulse length, and hence generally at lower cost, converting into light of a shorter pulse length, and then compressing it in space and time. The techniques may apply to any suitable laser source, including, but not limited to, glass, and may be used in conjunction with frequency changing techniques such as doubling or tripling or parametric shifting, for example, thereby changing frequency before, after, or during compression. The use of lookthrough compression cells, and/or the use of stimulated scattering mechanisms such as Brillouin and Raman scattering, and/or replaceable vacuum-gas interfaces may lead to no permanent optical surface being exposed to the full laser fluence in the compression and target delivery sections. The gases used in some embodiments for particular scattering and transport geometries are exposed to peak fluences of some $10^3$-$10^4$ joules/cm$^2$. For example, the damage fluence values for such gases at the 0.25 micron light wavelength and optical pulse lengths used in the compression process that range from $10^6$-$10^9$ seconds are generally on the order of $10^3$-$10^5$ joules/cm$^2$ (see, for example, I. C. E. Turcu, "Measurement of KrF Laser Breakdown Threshold in Gases," *Optics Communications*, Vol. 134, pp. 66-68, 1997, incorporated by reference herein for all purposes). The damage fluences are then generally of the order of a factor of $10^2$-$10^4$ higher than conventional solid material elements at such short wavelengths. Thus, the optical area and cost per unit energy may be reduced by such a factor for some embodiments.

It should be noted that a series of papers (see by J. P. Partanen and M. J. Shaw, "High-Power Forward Raman Amplifiers Employing Low-Pressure Gases in Light Guides: I. Theory and Applications," *Journal of the Optical Society of America B*, Vol. 3, No. 10, pp. 1374-1389, 1986; M. J. Shaw, J. P. Partanen, Y. Owadano, I. N. Ross, E. Hodgson, C. B. Edwards and F. O'Neill, "High-Power Forward Raman Amplifiers Employing Low-Pressure Gases in Light Guides: II. Experiments," *Journal of the Optical Society of America B*, Vol. 3, No. 10, pp. 1466-1475, 1986; I. N. Ross, M. J. Shaw, C. J. Hooker, M. H. Key, E. C. Harvey, J. M. D. Lister, J. E. Andrew, G. J. Hirst and P. A. Rodgers, "A High Performance Excimer Pumped Raman Laser," *Optics Communications*, Vol. 78, No. 3, 4, pp. 263-270, 1990; and M. J. Shaw, I. N. Ross, C. J. Hooker, J. M. Dodson, G. J. Hirst, J. M. D. Lister, E. J. Divall, A. K. Kidd, S. Hancock, A. R. Damerell and B. E. Wyborn, "Ultrahigh-Brightness KrF Laser System for Fast Ignition Studies," *Fusion Engineering and Design*, 44, pp. 209-214, 1999; incorporated by reference herein for all purposes) outlined a set of experimental, theoretical, and design considerations involving waveguides or lightguides for Raman converters. In these forward scattering converters, the pump beams may encounter the reflecting sides of the lightguide at about the same time they enter the Raman active region. The design in "Ultrahigh-Brightness KrF Laser System for Fast Ignition Studies," by M. J. Shaw et al., supra, shows shutters to separate the Raman gas from the laboratory gas in the extraction beam optical path. The designs of the previous works had material windows. One reason for the change may have been to eliminate the scatter from both linear and nonlinear index variations within or on the window material, as another paper (see C. J. Hooker, E. J. Divall, G. J. Hirst, J. M. D. Lister, M. J. Shaw and D. C. Wilson, "Novel Four-Wave Mixing Phenomenon in a Raman Amplifier, *Physical Review Letters*, Vol. 74, No. 21, pp. 4197-4201, 1995 incorporated by reference herein for all purposes) presented results showing such scatter was leading to parasitic wave growth. Such a lightguide is subject to the same material damage limitations on the lightguide reflectors; in addition, the pump fluence at the output was directed by material mirrors (see M. J. Shaw et al., FIG. 5 of "Ultrahigh-Brightness KrF Laser System for Fast Ignition Studies," supra). One other possible characteristic of some embodiments described herein is that there is little or no substantial scattering from the gaseous medium other than dust and Rayleigh and the stimulated scattering noise sources. This may lead to much higher stage gains due to lack of scatter from any material surface. In small scale experiments in isolated gain regions, gains of $e^{20-30}$ are commonly realized before stimulated scattering reaches the threshold for saturation and substantial depletion of the pump pulse. This may imply that the architectures and embodiments discussed herein can approach gains of $10^6$ or more per stage due to lack of feedback from optical surface scattering.

In some embodiments, once the laser light is generated at a long pulse length and, usually, relatively low optical fluence, it is concentrated in scattering regions. In such regions, it may be converted to a slightly longer wavelength with its optical properties controlled by a very low power seed beam (input fluence smaller than the output fluence of the scattering region by a factor of $\sim 10^{-3}$-$10^{-6}$). The output of one region may then be directed to another region where a second scattering process takes place. Also, the angles of the seed beams may be changed during the extraction process to send the output of one region to several other regions. In addition, by injecting a short seed beam in a near counter-propagating direction to the pump beam of the previous region, the pulse length may be shortened and a compression stage element may be realized. The output from a stage may become a pump beam for the next stage. Since the focusing and direction of the output of a given stage may be controlled by the seed beam into that stage, solid surfaces can be used to match the direction and optical parameters for pumping the next stage. The use of the scattering processes may allow for high stage gains. For the use of solid surfaces in controlling a seed beam, an example of $10^3$ joules/cm$^2$ stage output may entail a stage gain of $10^3$ for a 1 joule/cm$^2$ input seed beam fluence. In order to couple one stage to the next efficiently, it may be desirable to change the properties of the output from the stage during the time it drives the next stages. Angular multiplexing changes the pointing angle, for example. Other properties include, but are not limited to, the spatial and temporal coherence, the color, the bandwidth, the polarization, the size, and shape of the output at the entrance to the next stage. The pointing and other optical properties may be changed during the time the output is aimed in a given channel. Such variability may be much easier to achieve without fixed optical elements in the output since a wide variety of properties may be propagated through the exemplary gaseous media. The construction of such stage(s) is the subject of different embodiments and, in some cases, associated copending patent application, see "Lookthrough Compression Arrangement," by R. O. Hunter, Jr., U.S. patent application Ser. No. 15/788,429, filed Oct. 19, 2017.

With regard to some deleterious effects due to nonlinear index of refraction that may have controlled the design of glass lasers, the choice of materials and optical properties may be broadened. Either in or between stages, the properties of the various media and the optical properties of the laser beam (spatial and temporal coherence, etc.) may be chosen to optimize a design. For example, the finite spatial coherence of the beam may be utilized to reduce and/or stabilize the beam self-focusing due to its nonlinear index. For a local spread in beam angle greater than the wavefront tilt induced by intensity fluctuations, the growth rate should be greatly reduced. The B integral that characterizes the effect of the nonlinear interaction may be estimated:

$$B \simeq \frac{2\pi \ell n_{20} I}{\lambda},$$

where $n_{20}$ is the nonlinear index coefficient, I is the beam flux, l a characteristic path length, and $\lambda$ is the laser wavelength. For $B=2\pi$, the phase due to the nonlinearity may have lagged by 1 wavelength. Therefore, the peak induced wavefront angle is of the order $$\sim \frac{\lambda}{\lambda_\perp},$$

where $\lambda_\perp$ is the transverse wavelength of the phase modulation. The Bespalov and Talanov growth rate that may be used to characterize this effect is given by J. M. Soures in "Solid-State Lasers for ICF," in *Nuclear Fusion by Inertial Confinement: A Comprehensive Treatise*, G. Velarde, Y. Ronen and J. M. Martinez-Val (Eds.), CRC Press, Inc., 1993, Chapter 14, pp. 351-370, incorporated for reference herein for all purposes, and the transverse wavelength for peak growth may be derived as:

$$\lambda_{\perp p} = \frac{\lambda}{\left(\frac{2n_{20} I}{n}\right)^{1/2}},$$

where n is the linear index. For ultraviolet light ($\lambda=2.5\times10^{-5}$ cm), for example, and $n_{20}=4.6\times10^{-21}$ cm$^2$/watt (1 agamat of He) and I=$10^{13}$ watts/cm$^2$, $$\theta \sim \frac{\lambda}{\lambda_{\perp p}} \sim \left(\frac{2n_{20} I}{n}\right)^{1/2} \sim 3.03 \times 10^{-4} \text{ radians.}$$

For coherence spread angles much greater than this peak growth rate angle, suppression of this instability may be expected. Discussions of such coherence effects may be found, for example, in "Self-interaction of Incoherent Light Beams," by G. A. Pasmanik, *Soviet Physics JETP*, Vol. 39, No. 2, pp. 234-238, 1974, incorporated by reference herein for all purposes. One exemplary design may have a 0.2-meter×0.2-meter region and be about 500 meters from the injection point. If this design may be operated with the maximum allowed finite spatial coherence, this leads to a spread angle among the spatial components of the extracting beam of approximately $$\theta_s \sim \frac{.2 \text{ m}}{500 \text{ m}} = 4 \times 10^{-4} \text{ radians.}$$

For this example, the growth rate is then substantially reduced. Thus, by operating the extracting beam with angular dispersion among the spatial components, the beam may be able to operate well above the conventional B=2-3 limit for a quasi-collimated extraction beam.

Another effect that may be used to ameliorate the nonlinear growth may be the presence of free electrons. They introduce a net negative index contribution, as the difference between the original index of refraction and the sum of the contribution from the positive ion and the electron index may be negative. The effects of the electron contribution may be to reduce the nonlinear index growth rate and, for a large enough electron density, bring it to 0. An estimate of the electron density for the conditions above (1 amagat He with $10^{13}$ watts/cm$^2$ at 0.25µ wavelength) leads to $$\Delta n \cong -\frac{1}{2}\frac{n_e}{n_{ec}} = n_{20} I,$$

or
$\Delta n=n_{20}I=(4.6\times10^{-21}$ cm$^2$/watt) $(10^{13}$ watts cm$^2)=4.6\times 10^{-8}$ and $n_e=1.6\times10^{15}$ cm$^{-3}$ would balance the nonlinear growth.

This effect may have been observed in "Measurement of the Nonlinear Refractive Index of Air and Other Gases at 248 nm," by M. J. Shaw, C. J. Hooker and D. C. Wilson, *Optics Communications*, Vol. 103, pp. 153-160, 1993, incorporated by reference herein for all purposes.

One advantage with regard to utilization of a gaseous medium is that the production of such an electron density does not lead to an irreversible change in the medium properties (i.e., damage) as may occur in solid materials.

Some embodiments include a single stage conversion by directing a long pulse output ($\sim10^{-6}$-$10^{-8}$ seconds, for example) from a laser generator (Primary Laser Source) into a single scattering region (Compression, Section) where a 1 nanosecond near backward propagating pulse extracts the energy and focuses onto the target directly through a pressurized gas-to-vacuum transient interface at the entrance to the target chamber. Some embodiments utilize a multistage approach with some having three compression stages. First, there may be a laser module (the Primary Laser Source) to generate the light in a multiplicity of independent optical beams. The next three stages comprise the compression section. The first stage may be a combining region where the independent beams may be combined into a single beam that may be directed into a variety of different directions (optical multiplexing) and the area of the output beams from the laser module, set by material surface damage limitations, may be some 1,000 times larger than the output of the first stage. In this example, there may be no time compression at this stage. The individual multiplexed channels may be then directed to particular elements, specifically termed Active Time Delay Mirrors, that may be spaced different distances away. In these mirrors, each channel may be pumped at approximately a $10^{-7}$ second pulse length and may have its output redirected back in the general direction of the combiner toward the next stage. In addition, the pulse may be temporally compressed by a factor of 10 to a pulse length of $10^{-8}$ seconds. A different time delay may cause the outputs for the different mirrors to arrive around the same time and pump a fast compression stage. The fast compression stage may produce a very high quality beam that then focuses on the target through a transient gas to vacuum interface. This stage may operate with a time compression of about 10, for a $10^{-9}$ second output pulse length.

Stage efficiency is very important, as the overall efficiency is the product of individual stage efficiencies. In one embodiment, a combined spatial and temporal compression of some $10^{11}$ in the volume of the generated light may be realized in the final compressed pulse. For this example, stages may be designed to operate at approximately 1 atmosphere gas pressure and the output from a stage becomes the pump for the next by travelling through gaseous media. This generally means no high fluences (over around 1-10 joules/cm$^2$) are propagated onto or through permanent material surfaces. The high fluences may be propagated at $10^3$-$10^4$ joules/cm$^2$; so for a total energy of $4\times10^6$ joules, for example, 400-4,000 cm$^2$ of optical area per surface may be utilized for the seed beams of each stage. For 10 surfaces per seed beam, for example, this overall system may deliver $4\times10^6$ joules with a total compression optics area on the order of $10^5$ cm$^2$ of small size optics (where all beams may be less than 0.5 meters in transverse linear dimension). This area is much less (a factor lower than $10^{-2}$) as compared to a glass laser architecture.

In some embodiments, the optical short pulse fluences on the material surfaces are very low, while the fluence in the scattering areas are very high, leading to very small overall optical area, and hence, very low cost. The nonlinear scattering processes that may be utilized in some embodiments that can be achieved may take place at relatively high efficiency (e.g., 90% per stage) and thereby reducing the delivery efficiency by less than a factor of two while reducing the optical costs by a factor of some $10^3$. A laser of short wavelength (0.25-0.5 microns) with a cost of \$10.00/joule, energy in excess of $10^7$ joules, and an efficiency of 0.05 may be sufficient to provide a decisive step towards commercialization of ICF as an energy source.

Therefore, some embodiments provide an optical arrangement for which the main application is delivering a short, very high intensity beam for imploding ICF targets.

Some embodiments provide a laser fusion pulse that takes a relatively temporally long pulse length (~3 microseconds, for example) of short wavelength light and then temporally and spatially compresses it to a short pulse length ($10^{-9}$-$10^{-8}$ seconds, for example).

Some embodiments provide an optical compression technique that overcomes previous optical beam quality limitations.

Some embodiments provide an optical pulse generation technique that uses relatively poor optical quality pump beams with mirrors that also compress the pulse. The pulse then is further compressed in the final scattering medium and directed onto the target.

Some embodiments utilize lookthrough geometries in which the beam quality, focusing properties, and temporal and frequency content are determined by low power optical beams.

Some embodiments are able to utilize very high fluence replaceable interfaces between the vacuum of the target chamber and the pressure of the propagation and compression regions.

DRAWINGS—FIGURES

DRAWINGS - REFERENCE NUMERALS

- 100 Large Pump Module (LPM)
- 102 Turning Array (TA)
- 104 Raman Aperture Combiner (RAC) or Combiner
- 105 Propagation Gas
- 106 Time Delay Section
- 108 Active Time Delay Mirrors (ATDM) or Mirrors
- 110 Fast Compressor or Compressor
- 112 Vacuum Transition or Vacuum Transition Section or Transition Section
- 114 Target Chamber
- 116 Target
- 118 Backward Raman Mirror Inputs to Active Time Delay Mirrors
- 120 Fast Compressor Input
- 122 Raman Aperture Combiner Input
- 124 Large Pump Module Input Beams
- 126 Shutter or Transient Aperture
- 128 Window
- 130 Ambient Environment Enclosure (AEE)
- 132 Compression Stage or Compression Section
- 134 Primary Laser Source (PLS)
- 136 Seed Laser Source (SLS)
- 138 Seed Beam or Seed Laser Beam
- 140 Vacuum Transition Aperture
- 200 Large Pump Module Optical Output
- 202 Raman Aperture Combiner Optical Output
- 204 Time Delay Section Optical Output
- 206 Fast Compressor Optical Output
- 208 Vacuum Transition Output
- 210 Target Input
- 212 Active Time Delay Mirror Pump Input
- 214 Active Time Delay Mirror Pump Input Shutters
- 216 Active Time Delay Mirror Seed Input
- 218 Active Time Delay Mirror Amplified Output
- 220 Active Time Delay Mirror Amplified Output Shutters
- 222 Active Time Delay Mirror Reflector Module
- 224 Fast Compressor Input Shaping Optics
- 226 Target Hole
- 228 Optical Output at Target Hole
- 300 Angularly Multiplexed Forward Raman Scattered Outputs
- 302 N2 Gas Mixture Region
- 304 Argon Gas Region
- 306 Pump Beams from Turning Array
- 308 Turning Mirror
- 310 Raman Aperture Combiner Input Beam Expander
- 312 Color Coded and Angularly Addressed Inputs
- 400 Backward Raman Mirror Input
- 402 Raman Mirror Conversion and Compression Region - N2 mixtures
- 404 To Fast Compressor
- 406 Depleted Beam from Raman Aperture Combiner
- 408 Raman Aperture Combiner Beam
- 500 From Active Time Delay Mirrors
- 502 Vacuum
- 504 Transition Section Gas Region Shutter
- 506 Backward Brillouin Scattering Cell
- 508 Fast Compressor Input Optic
- 510 Turning Mirror - Fast Compressor
- 600 High Fluence Material Mirrors

DETAILED DESCRIPTION

A. Terms & Definitions

TRANSITION SECTION is generally referring to the interface between the gaseous, high pressure (~1 atmosphere) media used in the pulse compressor and the vacuum of the target chamber where the ICF target is placed.

Figure 4:
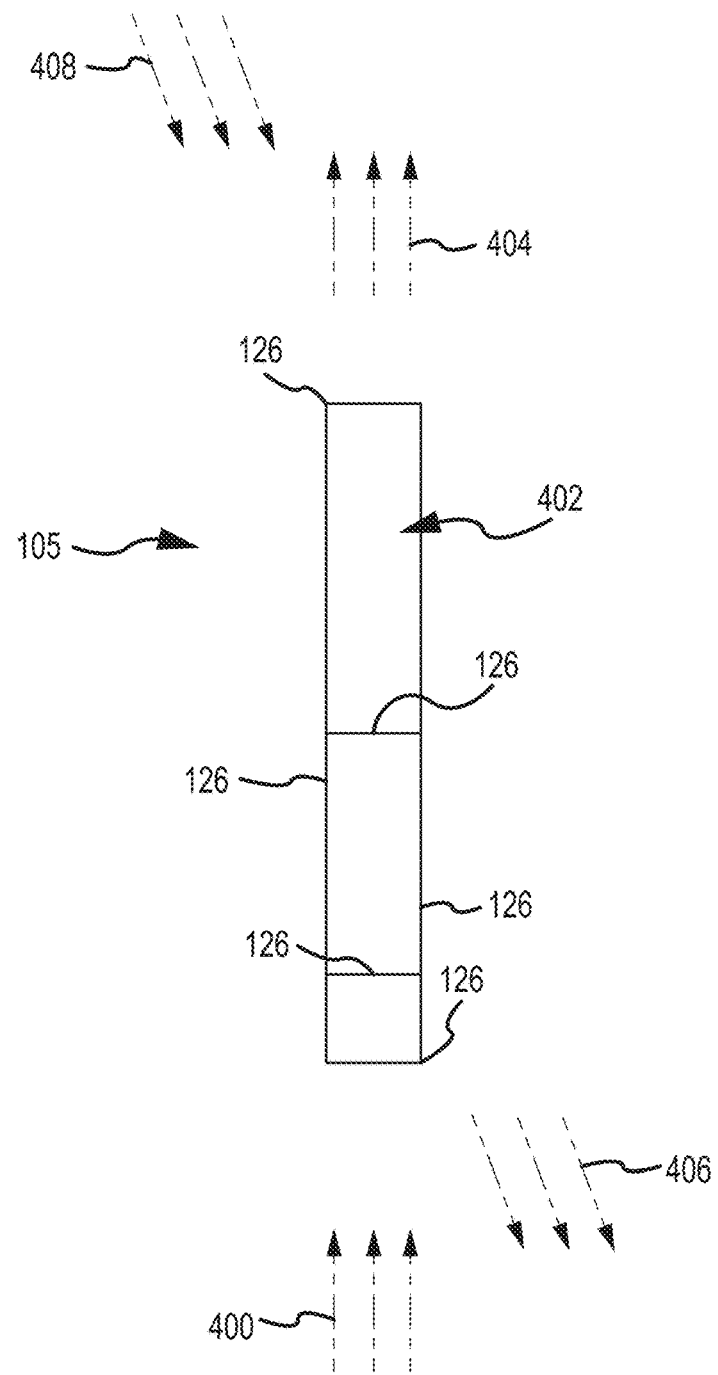
FIG. 4 shows the backward scattering to form an Active Time Delay Mirror [108] in accordance with various embodiments.

ACTIVE TIME DELAY MIRROR (ATDM) is generally referring to mirrors that are formed by a stimulated scattering process, such as Raman scattering (FIG. 4). They act as mirrors in that the bulk of the energy is generally reflected but the time, duration, and phase fronts of the reflected pulse can be modified. Since they may be made in lookthrough configurations, they can make the incident beam quality suitable for the next stage, and, with backward scattering, time compress the incident pulse as well. They are generally used herein as Time Delay Mirrors that may be angularly addressed. The beam quality control and time compression characteristics can be tailored to have the outputs directly drive a target as well. The combination of reflection and time compression in a gaseous medium may give very high operating fluence ($10$-$10^3$ times conventional material mirrors) and time compressions of about 10, for example.

INERTIAL CONFINEMENT FUSION (ICF) is generally a method of producing nuclear fusion energy by heating and compressing a target by an external driver that provides the energy for the initial heating and compression. Once ignited, the thermonuclear fusion reactions may produce a much greater amount of energy than provided by the driver. The target generally burns before it disassembles; hence, it is inertially confined. The external driver is usually a particle beam (heavy ions, light ions, laser, etc.), some form of magnetically accelerated shell, or incoherent x-rays, for example.

RAMAN SCATTERING in this context is generally referring to the scattering of light by an atom or molecule with internal degrees of freedom. In the scattering process, internal energy may be lost to or gained from the light. Thus, the scattered light may be frequency shifted. For energy gained, the process is generally called anti-Stokes (higher scattered light frequency than the original light beam); for energy lost, the process is generally called Stokes scattering (lower frequency than the incident light beam). Stimulated Raman scattering may occur when there is net gain and is used extensively in the components of the optical layout. A high intensity pump beam may pass through a Raman active medium and may be depleted; a second beam, often referred to as a seed beam, may be amplified in intensity. The pump beam energy may then be transferred to the seed beam. In gaseous media under certain circumstances, the beam quality of the stimulated beam may be decoupled and made much better than that of the pump beam. Also, the quantum efficiency may be quite high since, for example, in nitrogen rotational Raman scattering the energy lost is generally ~$10^2$ $cm^{-1}$ out of $4 \times 10^4$ $cm^{-1}$ incident energy at a 0.25 micron (krypton fluoride) light wavelength, implying a quantum efficiency of approximately 0.9975. Since light can scatter off any of the internal degrees of freedom, the largest gain process is often chosen to work with. The gain may be a function of pump and scattered light wavelengths, pump and scattered light pulse lengths, type and strength of transition, scattering angle between pump and stimulating beam, polarization, and/or line widths of the pump and scattered beams. Large scale Raman scattering may be used to combine many independent pump beams and/or to produce diffraction limited output from poor beam quality pump beams. A coupling coefficient may be used to relate the Raman gain and the pump power per area (optical pump flux). The Greek letter $\gamma$ is used herein and is usually in units of $cm^2$ $watt^{-1}$. The gain is generally given by $\gamma I_p$, with the pump flux in watts/$cm^2$. The gain is then in $cm^{-1}$. Gain length products of $\gamma I_p L$, where L is a characteristic length, may describe the amplification properties (units=nepers). For the forward and backward scattering processes incorporated herein, the amplified spontaneous emission (ASE) generated and amplified by the light beams may be used as a design consideration. Characteristically, gain length products of 10-40 due to ASE limitations may be possible, depending on the geometry.

BRILLOUIN SCATTERING is generally a light scattering process whereby an acoustic wave in a gaseous, solid, or liquid medium is excited during a light scattering process. As with Raman scattering, the beam quality of the stimulated scattered beam may be decoupled from the pump beam and independent apertures combined into a diffraction-limited output under certain conditions. It has generally not been used at low gas pressure (~1 atmosphere) due to the low gain coefficient and pump and extraction limitations due to optical element damage. In some embodiments herein, it is used in the Fast Compressor [110], for example, where very high pump fluences may be realized for the arrangements described herein. The ASE constraints for Brillouin scattering may be similar to those associated with Raman scattering for geometries of interest. In a typical operating regime, the allowable gain length products are generally somewhat less than those characteristic of the Raman scattering process. The frequency shift for Brillouin scattering is small for short wavelengths, leading to very high quantum efficiencies (≥0.999) for certain cases given herein. The gains are given by the same formula shown in the Raman scattering discussion above and are describable in terms of a coupling coefficient to combine the effects of the parameters governing the gain. The nomenclature is generally the same as for the Raman coupling constant. Particularly for backward scattering at low gas pressures (~1 atmosphere) and short wavelengths, the scattered excitation is the velocity field of scattered atoms or molecules as opposed to collective acoustic oscillations. In the Russian literature, the overall process is called Stimulated Molecular Scattering (STMS) and has been described by kinetic theory (see, for example, V. S. Averbakh, A. I. Makarov, and V. I. Talanov, "Stimulated Molecular Scattering of Light in Gases at Different Pressures," *Soviet Journal of Quantum Electronics*, Vol. 5, No. 10, pp. 1201-1206, 1976, incorporated by reference herein for all purposes).

FORWARD SCATTERING for our purposes generally describes light amplified in a stimulated scattering process that propagates in the same direction (within ±900) of the pump beam. Thus, the pump and stimulated beams may have wave vector components in the forward direction. It may be utilized in the Raman Aperture Combiner [104].

BACKWARD SCATTERING for our purposes generally describes the amplification of light in a stimulated scattering process wherein the stimulated beam is propagating in the opposite direction (within 90°-100°) of the pump beam. It may be used in both the Active Time Delay Mirrors [108] and Fast Compressor [110], for example. The pulse length of the stimulated seed beam may be much shorter than the pump beam, leading to its use as a time compression technique in both these sections. Both Raman and Brillouin scattering may occur in the backward direction. In some embodiments, the amplified backward pulse is in the quasi-steady state regime. A parameter is the saturation fluence, $S_b$, that can characterize the backward pulse energy per area required to efficiently convert the forward propagating pump pulse energy into the backward extracting pulse energy. $S_b=2/\gamma c$, where $\gamma$ is the coupling constant given above (see RAMAN SCATTERING and BRILLOUIN SCATTERING above) and c is the speed of light. In backward scattering, the asymmetry between forward and backward gain for both Brillouin and Raman scattering may lead to different ASE constraints for gain-length products for the amplified stimulated beam and for the transverse dimensions of the converter cell.

ANGULAR MULTIPLEXING is a term generally used to denote extraction from a laser medium by a multitude of control beams aimed in different directions. The patent "High Energy Laser," by R. O. Hunter, Jr., and D. L. Fried, supra, and the patent "Compressed Pulse Laser," by R. O. Hunter, Jr., supra, incorporated by reference herein for all purposes, describes a practical large-scale method of producing the angular addressing and, by means of different time delays for different angular channels, efficiently compressing the overall pulse in time. The Aurora project (see L. A. Rosocha, S. J. Dzuchlewski, B. J. Krohn and J. McLeod, *Nuclear Fusion by Inertial Confinement: A Comprehensive Treatise*, CRC Press, Inc., 1993, incorporated by reference herein for all purposes; see D. C. Cartwright, "Inertial Confinement Fusion at Los Alamos," Los Alamos National Laboratory, LA-UR-89-2675, Vol. 1, 1989, incorporated by reference herein for all purposes) showed how pure angular multiplexing, as described in "High Energy Laser," by R. O. Hunter, Jr., 2012, supra, and the patent "Compressed Pulse Laser," by R. O. Hunter, Jr., supra, incorporated by reference herein for all purposes, could achieve temporal compressions of some $10^2$:1. In some embodiments, angular multiplexing is used in the Raman Aperture Combiner [104, FIG. 3] in conjunction with the Active Time Delay Mirrors [108] for substantial temporal pulse compression.

PULSE COMPRESSION is generally used herein to denote methods of taking a temporally long laser pulse and making it shorter in time. Focusing in the transverse direction may be also used to make the volume the light occupies smaller; usually the term pulse compression refers to temporal compression. In the pure optical compression systems characteristic of our discussion, the total volumetric light compression may be of the order of about $10^{11}$. Of this, about $3\times10^3$ may be the temporal factor and about $3\times10^7$ may be due to focusing (transverse compression). In some cases, such volumetric compression may be accomplished in stages. The stages can be a mixture of both types of compression. In some embodiments, there are three compression stages. The first stage may be purely transverse, with a total volumetric compression ratio of about $1.6\times10^3$, for example. The second stage may be largely temporal, with a total volumetric compression ratio of $4\times10^2$, for example. The third stage may be a combination, with a temporal compression ratio of 10 and focusing compression ratio of $3\times10^4$ for a total volumetric compression of $3\times10^5$, for example. The product of the three stages may then be $2\times10^{11}$.

KRYPTON FLUORIDE (KrF) LASER was discovered in 1975 and is an efficient ultraviolet excimer laser (efficiency ~0.10 from electrical energy in laser volume to laser light, in some cases). It has been used for pulse compression for the ICF application. It has generally seen widespread use in industrial and scientific applications, particularly semiconductor manufacture. It may have an unbound lower state and, hence, may be efficiently line narrowed and tuned. Its centerline wavelength (vacuum) generally is at 0.2485 microns, or the mid UV.

LOOKTHROUGH CONFIGURATION refers generally to a geometry where the phase, spectral, and beam control characteristics of a laser are imposed before amplification. This means that the control characteristics may be handled in low power sections. High gains may be desirable in the amplification stage. They may lend themselves to applications where beam handling by mirrors or lenses at the output operating fluence is difficult or impractical. Adaptive optic control and correction can best be achieved with such configurations.

TRANSIENT APERTURE or optical opening that may operate for only a brief period of time. A mechanical shutter after the manner of a venetian blind or guillotine which can actuate over ~1 sec time periods is one example.

B. General Operation

Some embodiments include new and unique optical arrangements that may provide very significant cost reductions, compared to storage lasers or previous pulse compression schemes, by increasing the fluence in the laser beam train and eliminating the optical elements previously envisioned; this can lead to much smaller optical areas. Merely by way of example, Tables I and II show the values of damage fluence for gaseous optical elements versus material optical elements at a short wavelength of interest for some ICF applications. In some embodiments, there can be a factor of $10^3$-$10^4$ improvement in the fluence (energy/area) that may be handled at the wavelength and pulse lengths of interest. In Table I, a constant energy scaling is used, at the shorter pulse lengths of $10^{-9}$ seconds, it may well be reduced by a substantial factor. Shorter pulse lengths at the high fluences may be obtained in the gaseous media relative to solid storage media in some cases.

TABLE I

Optical Fluence Limitation for .25 Micron Wavelength Short Pulses: Fluences for Gas Breakdown[1] (joules/cm$^2$) for .25 micron wavelength

| | PULSE LENGTH | | |
|---|---|---|---|
| GAS | $10^{-7}$ seconds (est. extrapolation) | $1.8 \times 10^{-8}$ seconds (est. data) | $10^{-9}$ seconds |
| He | $1.5 \times 10^5$ | $9 \times 10^4$ | $2 \times 10^4$ |
| Ne | $10^5$ | $3.6 \times 10^4$ | $10^4$ |
| Ar | $1.8 \times 10^3$ | $1.26 \times 10^3$ | $6.5 \times 10^2$ |
| Kr | $1.2 \times 10^3$ | $5.40 \times 10^2$ | $1.1 \times 102$ |
| Air | $8 \times 10^3$ | $4.68 \times 10^3$ | $1.9 \times 10^3$ |

[1]Estimated from data in "Measurement of KrF Laser Breakdown Threshold in Gases," by I. C. E. Turcu, M. C. Gower and P. Huntington, *Optics Communications*, 134, pp. 66-68, 1997, taken at $1.8 \times 10^{-8}$ seconds pulse length and extrapolation with a simple scaling model.

Figure 1:
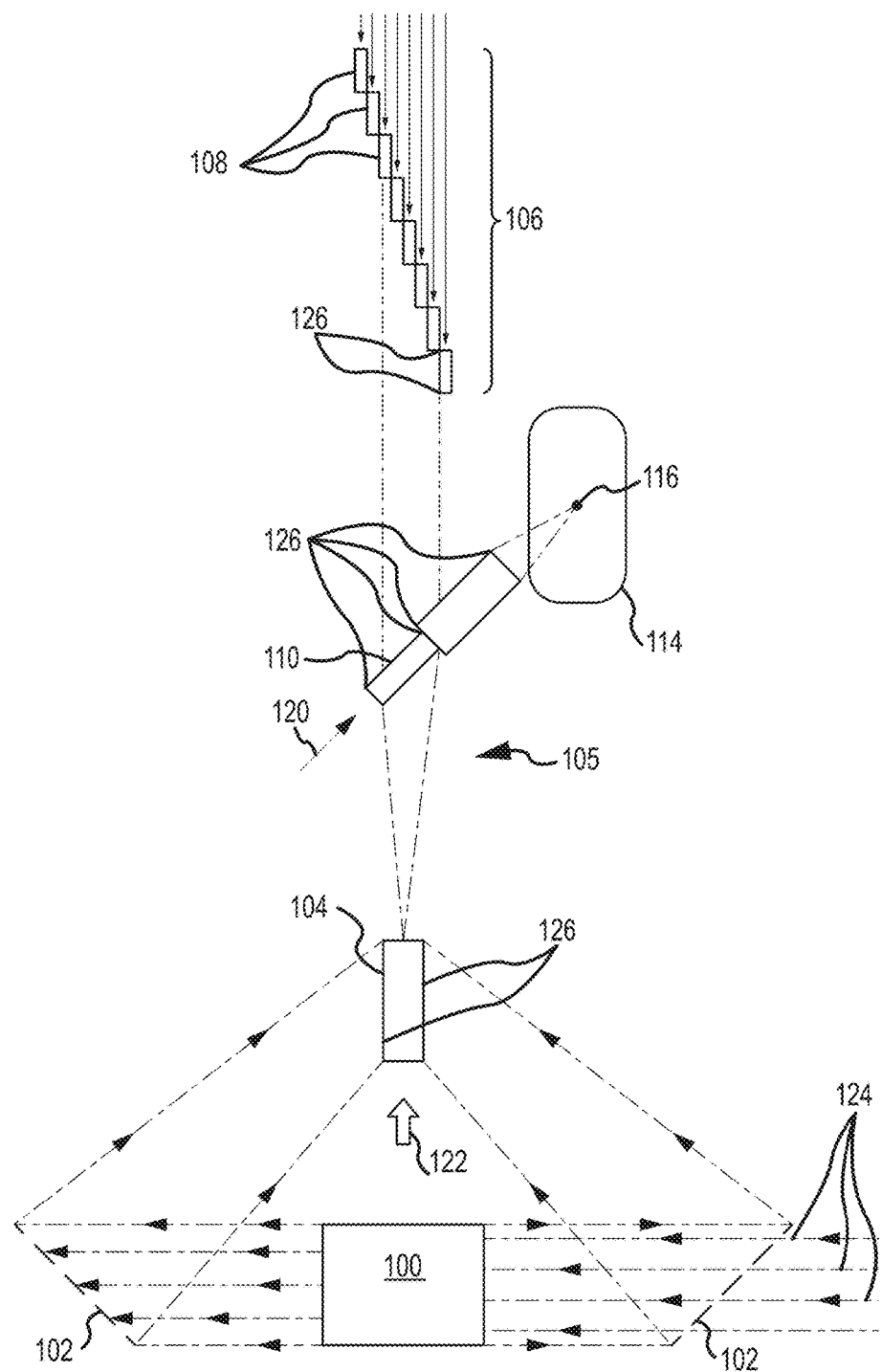
FIG. 1 shows an embodiment of the optical arrangement made in accordance with the present invention.
Figure 14:
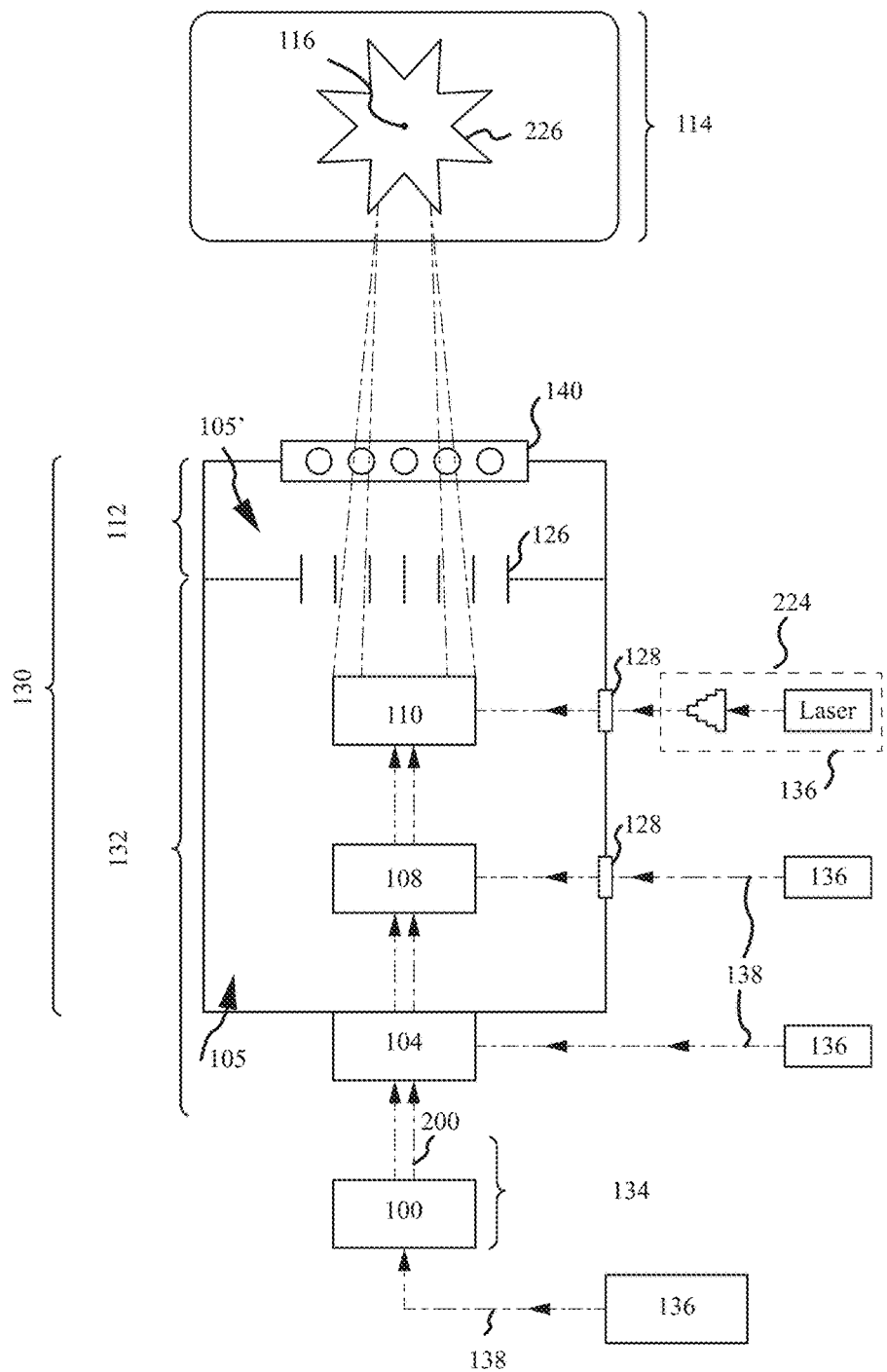
FIG. 14 shows a configuration utilizing a phase plate pattern to give the desired focal pattern before passing through the Fast Compressor in accordance with various embodiments.

Some embodiments may have additional advantages for reactor level systems in terms of operating characteristics, for example, by keeping laser fluences on material optical surfaces very low to ensure long lifetimes and hence provide a very large number of pulses. Optical costs and optical element fragility have generally been a major complication in the development of ICF both for the glass laser medium and for the beam handling elements (see, for example, R. H. Sawicki, in M. A. Lane and C. R. Wuest (Eds.), "The National Ignition Facility: Laser System, Beam Line Design and Construction," *Optical Engineering at the Lawrence Livermore National Laboratory II: The National Ignition Facility, Proceedings of SPIE*, Vol. 5341, pp. 43-53, 2004, incorporated by reference herein for all purposes; and J. H. Campbell, R. A. Hawley-Fedder, C. J. Stolz, J. A. Menapace, M. R. Boprden, P. K. Whitman, J. Yu M. Runkel, M. O. Riley, M. D. Feit, and R. P. Hackett, in M. A. Lane and C. R. Wuest (Eds.), "NIF Optical Materials and Fabrication Technologies: An Overview," *Optical Engineering at the Lawrence Livermore National Laboratory II: The National Ignition Facility, Proceedings of SPIE*, Vol. 5341, pp. 84-101, 2004, incorporated by reference herein for all purposes). Also, figuring of large high-precision optical surfaces may be eliminated as part of the manufacturing process for these systems. As compared to the optical glass storage system, the optical area per unit energy of laser light delivered may be reduced by a factor of $10^3$. FIGS. 1 and 14 show embodiments of the overall optical arrangement.

TABLE II

Damage Fluences Limited by Solid Material Damage: Damage Threshold[2] (joules/cm$^2$) for .25 micron light

| | PULSE LENGTH | | | | |
|---|---|---|---|---|---|
| | EXTRAPOLATED | | | DATA | |
| MATERIAL | $10^{-9}$ seconds | $10^{-8}$ seconds | $10^{-7}$ seconds | $3 \times 10^{-8}$ seconds | $1.5 \times 10^{-8}$ seconds |
| Bulk SiO$_2$ Window or Substrate High Reflectivity Coatings | 1.1 | 2.2 | 4.2 | 3 | — |
| fluorides | 12 | 23.9 | 48 | — | 27 |
| Conditioned Al$_2$O$_3$/SiO$_2$ | 5.8 | 11.5 | 23 | — | 13 |
| Unconditioned Al$_2$O$_3$/SiO$_2$ | 3.6-5.8 | 7.2-11.5 | 14.3-23 | 10-16 | — |

[2]Data taken from reference 2 in N. Kaiser, et al., "High Damage Threshold Al$_2$O$_3$/SiO$_2$ Coatings for Excimer Lasers," *Thin Solid Films*, 260, pp. 86-92, 1995. Extrapolated by (pulse length)$^{-3}$.

Figure 2:
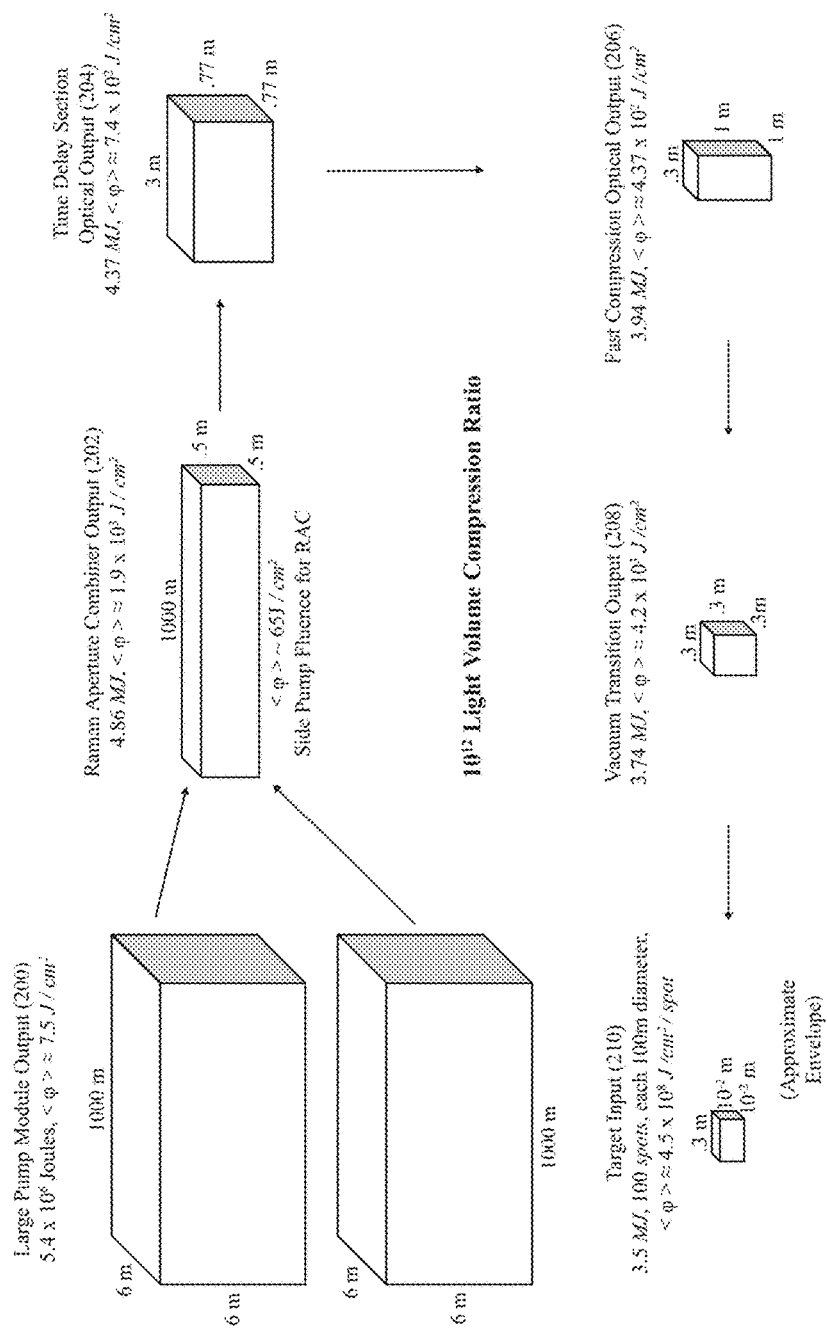
FIG. 2 shows the spatial and temporal compression profile of the FIG. 1 arrangement in accordance with various embodiments.

Some embodiments couple one compression stage to the next directly, i.e., the optical output from one stage may pump the next stage directly without impinging on intervening optical surfaces. The compression stages may be run as amplifiers; i.e., they may have an input signal that is amplified to a high level by extracting the energy in the scattering process. In the course of the amplification process, the input signal may also be temporally shorter than the pump pulse coming from the previous stage and so compress the pulse in time. Also, the previous stage energy may be spatially compressed or expanded in the transverse dimension by changing the beam focal properties to matching the amplification properties of the medium to the power levels produced by the previous stage. FIG. 2 shows the progression of pulse compression in accordance with various embodiments. This variation may show two long pulse length blocks of light of large area [200] produced by a Large Pump Module [100, FIG. 1]. The energy fluence per area is some 7.5 joules/cm$^2$ at a temporal pulse width of $3 \times 10^6$ seconds. Returning to FIG. 1, these blocks of light are first compressed spatially only, in a unit called the Raman Aperture Combiner [104]. In this embodiment, a large block of light [200, FIG. 2] from the LPM is composed of sub blocks of lateral dimension around 0.3 meters. The individual subblock directions may be overlapped in the combiner by using segmented material turning mirrors at high efficiency. The subblocks of light may not be of extremely good spatial quality in some cases; for this case, there are conditions of the bandwidth of the light as compared to the scattering linewidth of the Raman process utilized, the crossing angle with the extracting beam, the angles between the various subblocks, and other factors. Thus, the subblocks of light may be overlapped in the Raman Aperture Combiner [104] in this case and laterally compressed by a factor of about 300 in area. Since the material damage fluence of the Raman Aperture Combiner Input [122] being amplified are in the range of 10 joules/cm$^2$ and the output fluence is $2 \times 10^3$ joules/cm$^2$, the stage gain of the combiner may be in excess of 200 to avoid damage to the optics conveying the input pulse to the Combiner. The Combiner medium properties may be chosen to permit such large gains and to avoid breakdown and substantial loss into unwanted processes (absorption and undesirable scattering) in the Combiner. The spatial overlap of the pump beams in the combiner may occur in a gaseous medium with a fluence of about 65 joules/cm$^2$. For example, in FIG. 2, the values given are for the light block(s) coming out of each element in accordance with various embodiments; since the Combiner is side pumped (with overlapping beams) in this embodiment, the pump fluence from the Large Pump Module [100] entering may be less than the extraction fluence exiting the Raman Aperture Combiner [104]. The seed beam input drive to the Combiner may be sequentially aimed into multiple separate angular channels (e.g., 36 channels or one for each active time delay mirror in the time delay section). The output aperture of the Combiner may be in some embodiments the same size as the aperture of the element of the next stage, the Active Time Delay Mirrors [108]. This design feature may avoid focusing at different distances for the different channel outputs from the Combiner. The next stage, the Time Delay Section [106], may involve a time compression of about 300:1, for example, and if the Combiner output aperture is 1:1 with each mirror aperture, the block of light coming from the combined Active Time Delay Mirrors may be 36 times the area of Combiner output. In addition to the 36 channels for Active Time Delay Mirrors [108], each Active Time Delay Mirror [108] may time compress the pulse addressing it from the Raman Aperture Combiner [104] by a factor of some 8.3, in this example, and "reflect" each compressed channel pulse. By differential time delay of each channel, an overall time compression of 8.3×36≅300 may be realized. The "reflection" properties may be set by an input seed beam signal to each mirror that is amplified by a factor of some 10$^3$, for example. The input signal to an Active Time Delay Mirror [108] may have focusing, spectral and/or temporal phase properties that may provide the correct properties to drive the next stage, the Fast Compressor. In all three of these stages, Combiner, Mirrors, and Compressor, the beams from the preceding stage may be tailored to produce high conversion efficiency in the next stage. As compared to fixed material mirrors, there may be much more flexibility in the output. In these example cases, each stage is close to constant area with the region it is pumping at a given time in the next stage, as the matching from stage to stage is done by spreading out (Combiner to Mirrors), overlap (Mirrors to Compressor), and focusing (Compressor to Target). This simplifies the optical design. It may not be a requirement for the architecture to work effectively. One factor in high efficiency conversion may be the uniformity of the pump beams, especially since certain versions require narrow spectral bandwidth. This may produce speckle, or strong intensity fluctuations, from one stage output to the next stage pump input due to phase aberrations that are introduced. There are many ways of dealing with this, including adaptive optical sensing and/or correction of the wavefront prior to the input plane for that stage to reduce the speckle of the output for that stage, and forms of beam modulation to smooth profiles (for similar techniques used to smooth focal intensity patterns on targets, see R. L. McRory, Jr., "Laser-driven ICF Experiments," *Nuclear Fusion by Inertial Confinement: A Comprehensive Treatise*, G. Velarde, Y. Ronen and J. M. Martinez-Val. (Eds.), CRC Press, Inc., Boca Raton, Fla., Chapter 22, pp. 555-596, 1993, incorporated by reference herein for all purposes). In addition, the stage may be driven with tailored finite spatial coherence beams, so that the optical characteristics are similar to imaging systems. This phase modulation (transverse, spatial and/or temporal) as well as channel overlap from the different ATDMs [108] on the Fast Compressor [110] may be utilized to reduce such fluctuations. In some embodiments, there is modulation of the input to the Combiner and the Mirrors to control speckle; the Compressor pump uses overlap of different mirror channels in addition.

To increase efficiency, it may be desirable to time synchronize the position of the pump beam from the previous stage with the position of the extracting seed beam as it is amplified. The Fast Compressor, in particular, generally, has a fairly large incidence angle (~22° from the back scattering direction in one layout, for example,) for the pump beams coming from the Active Time Delay Mirror Array. Thus, the outputs of the previous stage may be moved in angle (swept) and/or multiplexed in angle to get the highest efficiency.

The Compressor may then accept overlapped Mirror outputs and, in a backward scattering geometry, may produce an additional time compression of a factor of about 10. At the same time, the beam quality can be improved since the Mirror channel properties (spectral and angular) may be tailored to decouple the Mirror channel beam properties from the Compressor output properties. Here, achieving near diffraction limited beam quality of the output from the Compressor and, in the case shown in FIG. 1, focusing the Fast Compressor Output [206, FIG. 2] into 100 separate spots, for example, of nearly equal uniformity are quite different optical transformations than in the Combiner or the Mirrors. The spot to spot uniformity may be increased by having the beam for each spot essentially completely overlapped within the Fast Compressor to that for the other spots as they propagate through the amplifying medium, so the beam for each spot sees the same amplification. In addition, multiple Fast Compressor segments may be operated in parallel with each one irradiating the same spot array (or arbitrary pattern). Multiple colors may then be introduced as well as enhanced spot to spot (pattern) uniformity. Since the output from the Compressor at the Vacuum Transition interface may be at fluence levels over some 5×10$^3$ joules/cm$^2$ in a 10$^{-9}$ second pulse, medium breakdown and absorption is a strong design constraint. Also, a stage gain of some 5,000 for the Fast Compressor may be used. The output then may be propagated through a Vacuum Transition Section and on to the target. The Transition may serve to separate the gaseous regions from the vacuum of the Target Chamber. In some embodiments, the fluences are in the 10$^4$ joules/cm$^2$ range and the major requirements are to not induce nonlinear phase distortion that would blur the focal spots and not to induce substantial nonlinear absorption, so as to not diminish the energy on target.

Index and density matching generally refers to the use of gaseous media that are separated by Transient Apertures or shutters that are opened just prior to the laser pulse generation and compression. Index matching generally refers to matching two or more separate gases having the same index of refraction at the wavelength of interest. Various gas mixtures may be employed for matching. The optical path may not be disturbed by mixing or by the flow of index-matched gases; thus, the shutter action may not degrade the optical quality. Density matching generally means the two or more gas media have the same density. With shutters, this implies the gases may not flow differentially under the influence of gravity. Hence, in some embodiments, the interfaces may be stable and the gases may be efficiently captured during shutter closure. This may reduce replacement of mixtures with each opening. Both index and density matching may be achieved simultaneously in some, but not all, cases.

The embodiment shown in FIG. 1 is based on stage designs (not necessarily the Large Pump Module, which may have material windows and may be operated at any pressure, for example) that use 1 atmosphere of pressure.

Thus, from the output of the Large Pump Module to the Vacuum Transition, the laser compression and propagation may all occur in gaseous media at the same pressure. The optimum pressure may be found experimentally and by system optimization. One atmosphere was chosen in this example for exemplary purposes only. Other pressures may be utilized.

Thus, the criteria leading to an overall reduction of cost center on high stage conversion efficiency at high stage gain ($\geq 10^3$). The choice of scattering process and configurations may be determined to simultaneously achieving the performance as outlined.

The Compression and Transition stages may give very high (near diffraction limited) optical quality. They may be relatively compact and of small optical area. The rest of the optical train can have a lower optical quality and substantially worse propagation characteristics. Adaptive optics may be utilized, particularly in the Fast Compression [110] stages.

Figure 7:
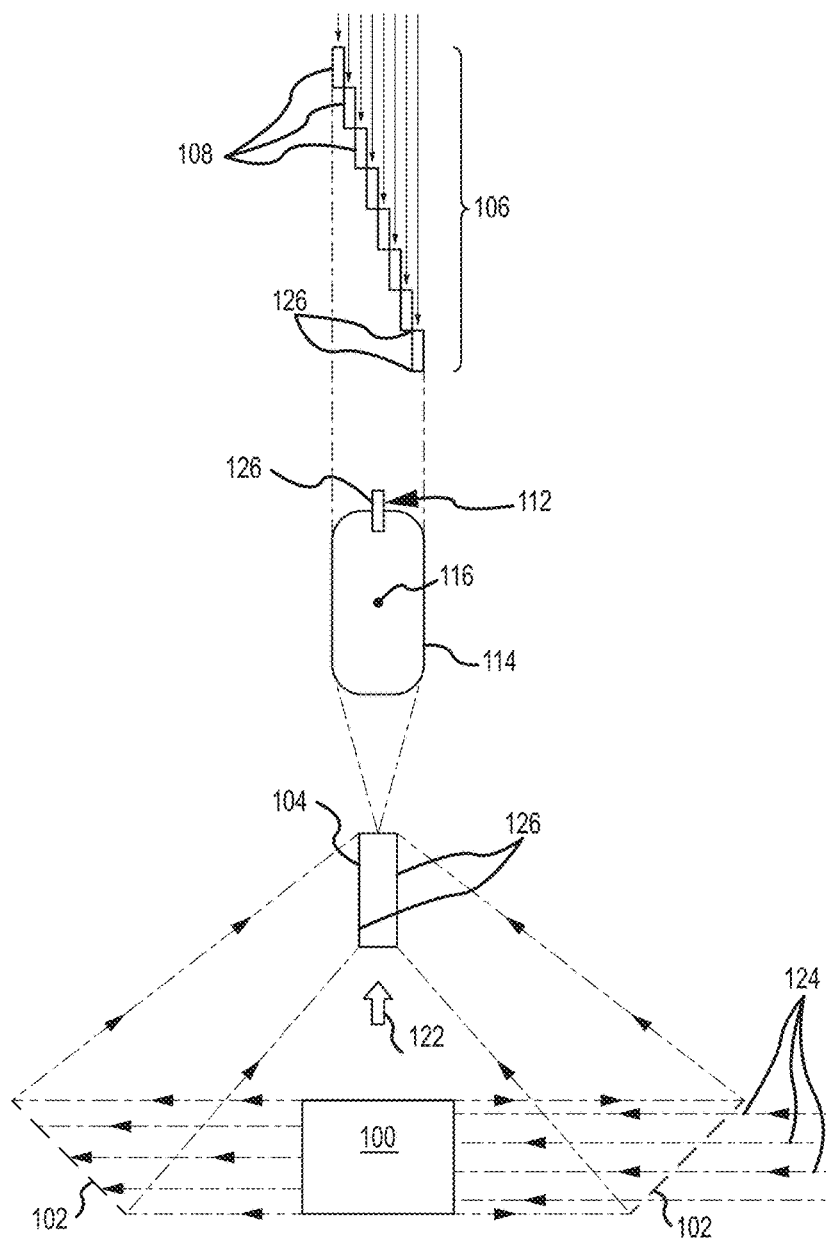
FIG. 7 illustrates the optical layout using a Direct Compression Backward Raman-Mirror Array in accordance with various embodiments.
Figure 8:
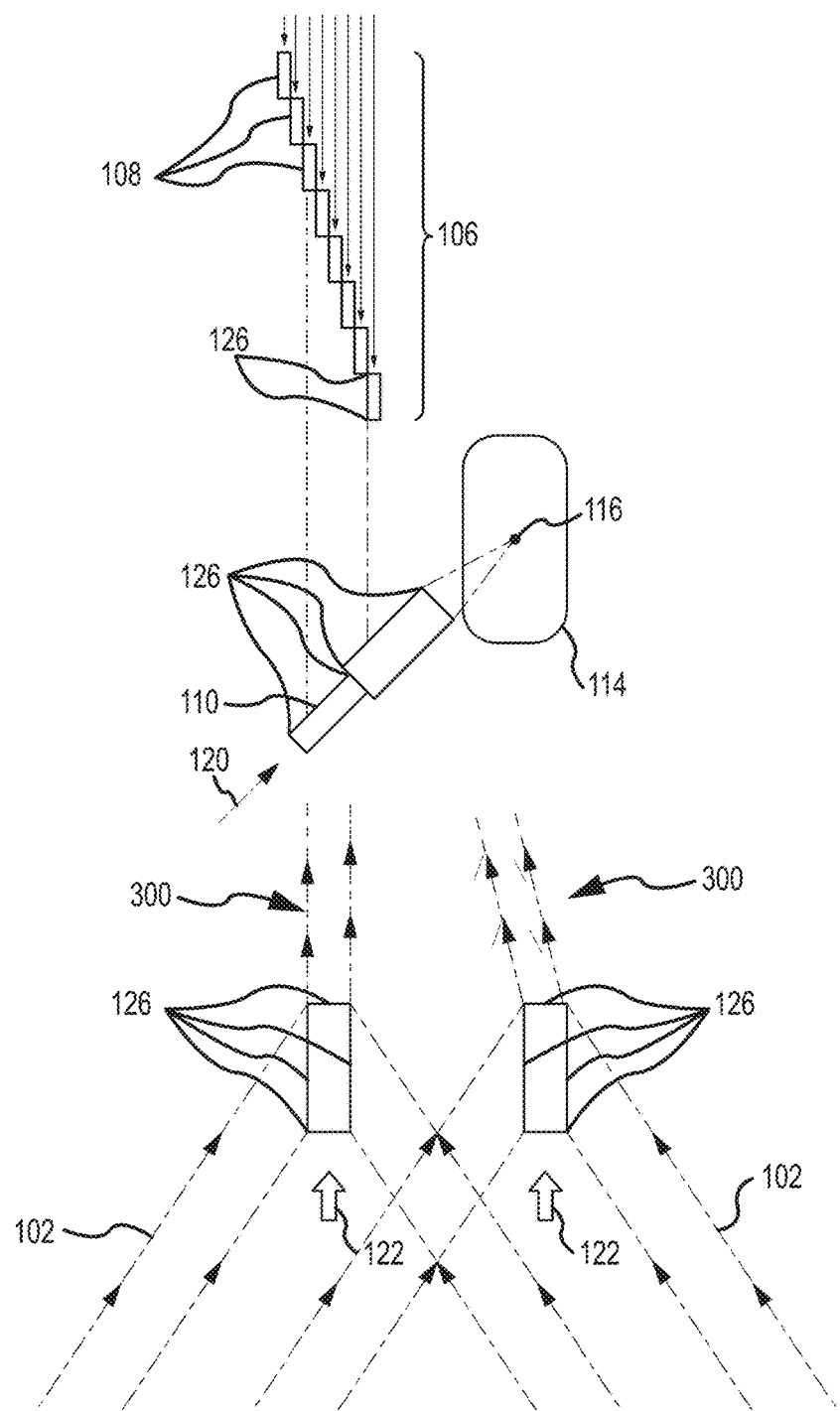
FIG. 8 illustrates using Multiple Beam Irradiance for the Active Time Delay Mirrors in accordance with various embodiments.
Figure 9:
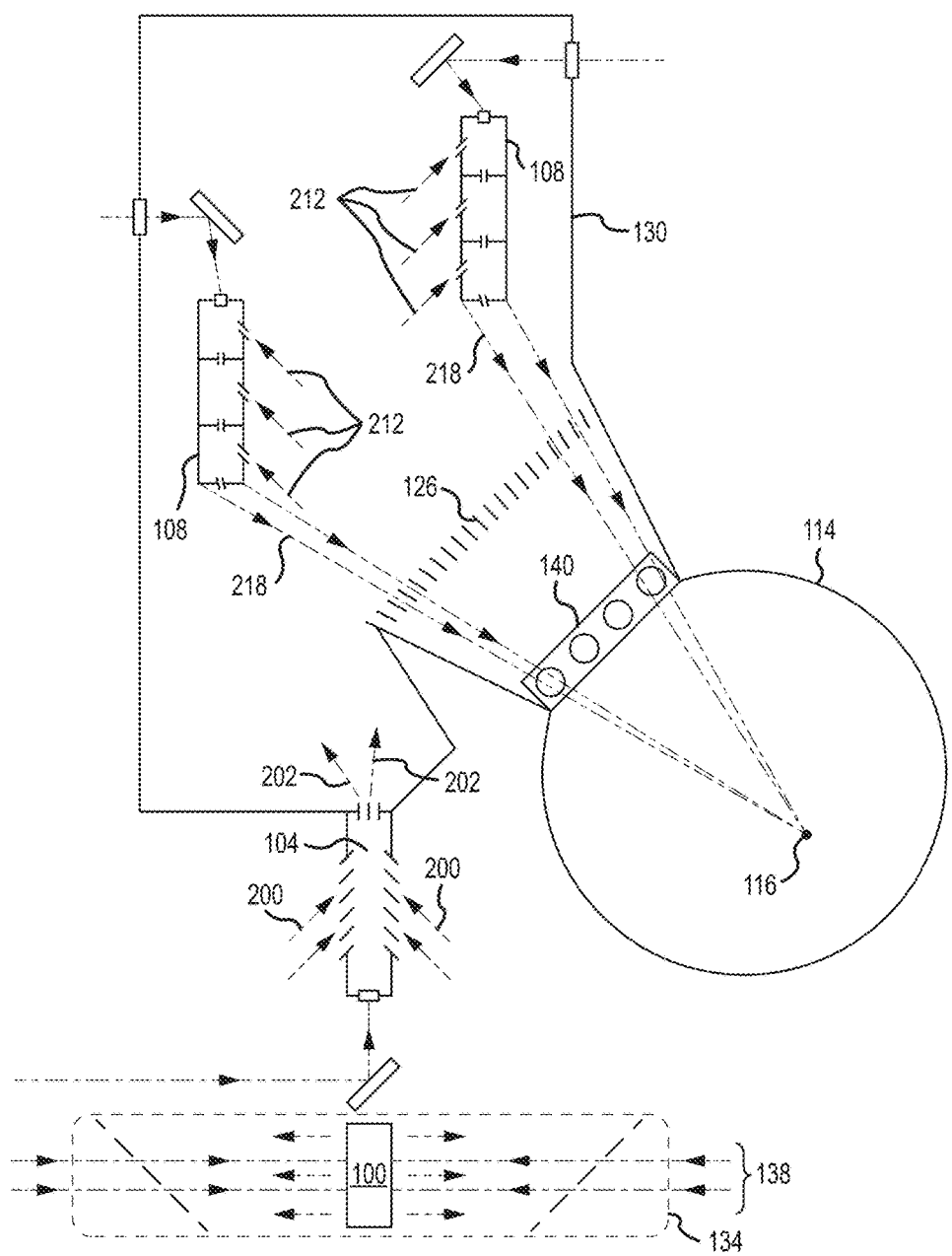
FIG. 9 shows a schematic layout of system where compression section comprises a Raman Aperture Converter [104] followed by Active Time Delay Mirrors [108] that then focus directly on the ICF target [116] in accordance with various embodiments.
Figure 10:
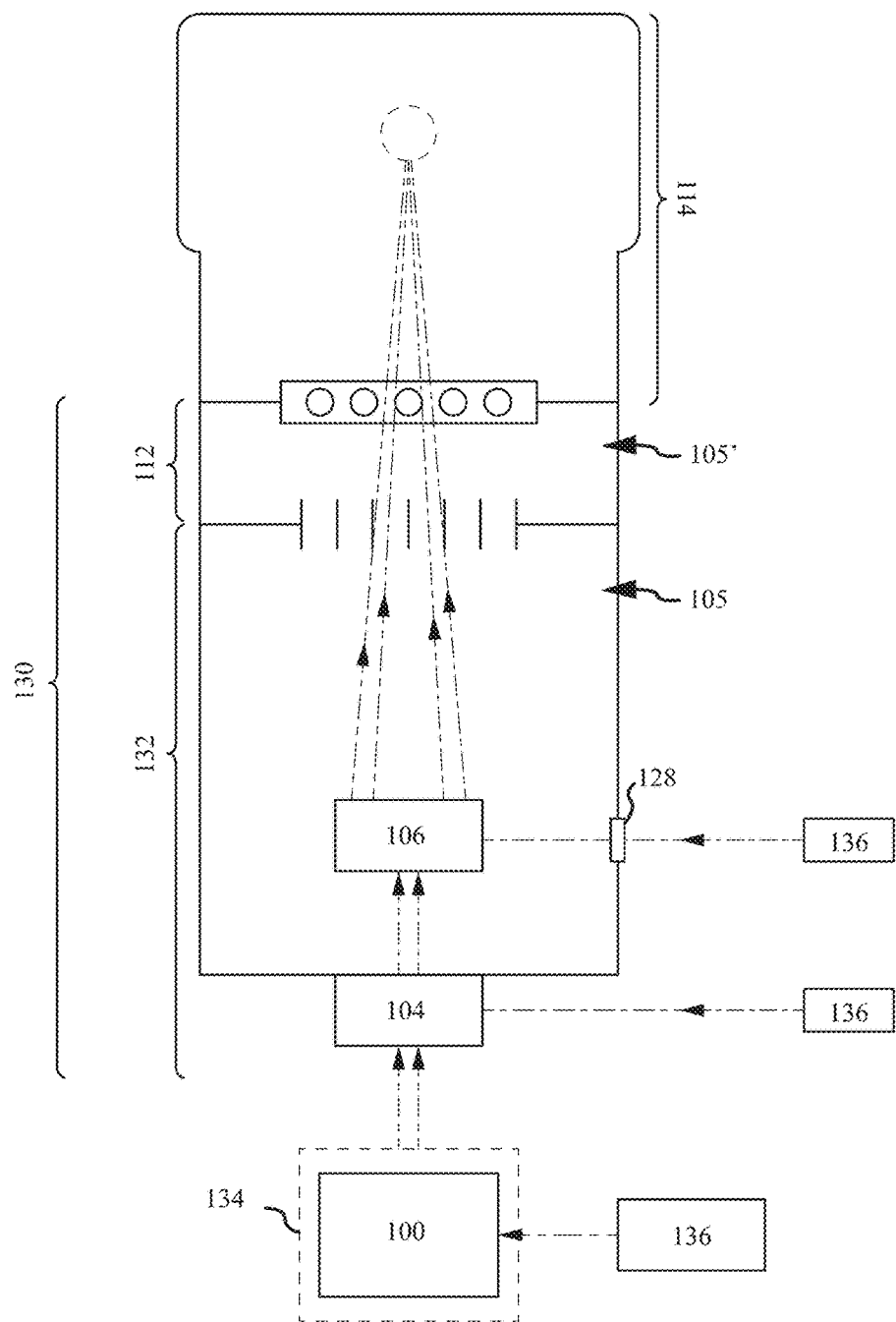
FIG. 10 shows a schematic layout of system where compression section comprises a Raman Aperture Converter [104] followed by Active Time Delay Mirrors [108] that then focus directly on the ICF target [116] in accordance with various embodiments.
Figure 11:
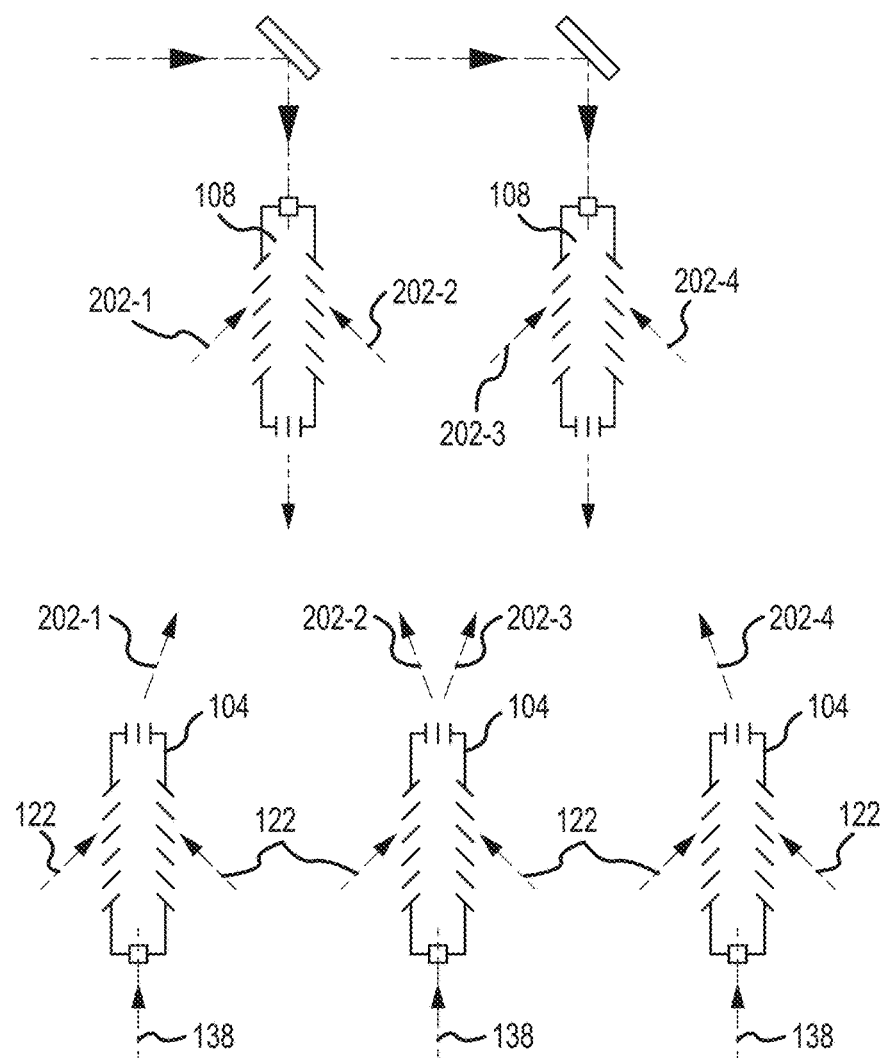
FIG. 11 shows multiple Raman Aperture Combiners [104] driving multiple Active Time Delay Mirrors [108] in accordance with various embodiments.
Figure 12:
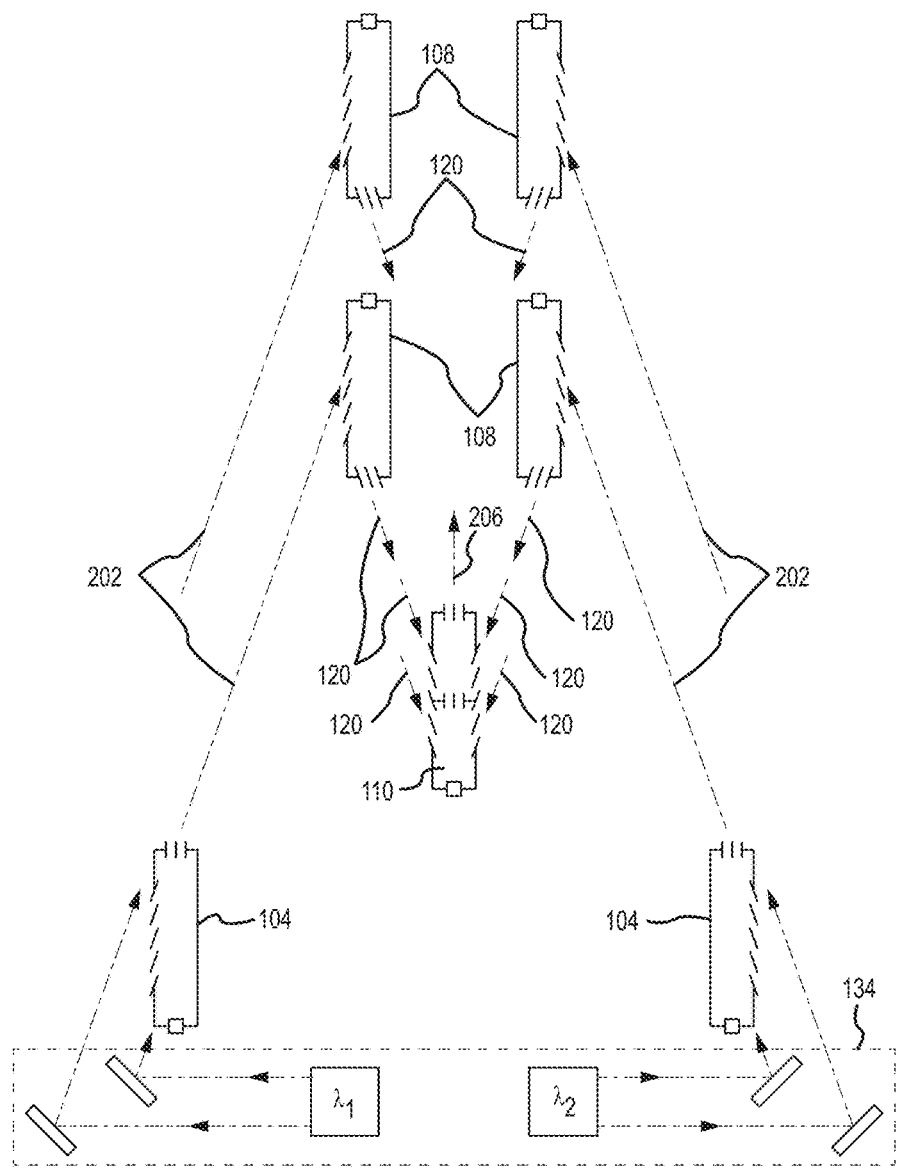
FIG. 12 shows Raman Aperture Converters [104] being driven at different wavelengths ($\lambda_1$, $\lambda_2$) and producing output at different colors ([202] and [202]') that is used to drive Active Time Delay Mirrors [108] resulting in two different wavelengths ([120] and [120]) for use in different sections of the Fast Compressor [110] in accordance with various embodiments.

There are many variations of the above architecture. For example, if a somewhat longer output pulse such as a $10^{-8}$ second pulse length may be desired, pulse compression can be accomplished with the Active Time Delay Mirrors alone, and the various mirrors can be brought into phase coherence in order to produce the desired spatial focal properties (FIGS. 9 and 10). For a 300 micron spot at $10^{-8}$ seconds, for example, with an ATDM array average focal length of 300 meters, phasing the 36 mirror segments may give about the 300 micron spot size for a near diffraction limited beam (FIG. 7). Here, the beam can be propagated through a transient window or transient aperture (not shown) as well (FIG. 8). Also, multiple aperture combiners can be used to drive each mirror (FIG. 11). The different mirrors can be utilized at different colors to drive different portions of the Fast Compressor to produce broad bandwidths in the output beam (FIG. 12). Different Pump Modules or Pump Module output channels producing largely different colors of outputs may drive mirrors at multiple colors. An example would be a Large Pump Module with XeCl output ($0.3\mu = \lambda_1$) being paired with a KrF Large Pump Module ($0.25\mu = \lambda_2$; FIG. 12). The segmented outputs of an LPM may be passed through frequency conversion sections (such as parametric amplifiers) to produce tunable high power pumps for the combiner. For a transition such as KrF, a given large Pump Module output channel may operate at a frequency tuned across the gain bandwidth (~10 cm$^{-1}$ or more) to produce a set of channel colors. The bandwidth of each channel may be separately controlled. Another example would be convert the output wavelength of one or more Large Pump Module output channels with a wavelength shifting device, such as an Optical Parametric Oscillator (OPO). Multiline operation of any combination of elements can be used to generate the desired output spectrum. Also, material windows can be utilized where the damage thresholds permit. For example, if it is desired to operate in wavelength regions, such as the green, where the damage thresholds are much higher, regions of Combiners may be separated by Time Delay Sections (including ATDMs), Fast Compressor, and Target Chamber permanent windows. The direct geometry, where the output of a stage pumps the next stage, may reduce the mirror area substantially, compared to previous geometrics (see, for example, J. J. Ewing et al., "Optical Pulse Compressor Systems for Laser Fusion," supra).

Figure 13:
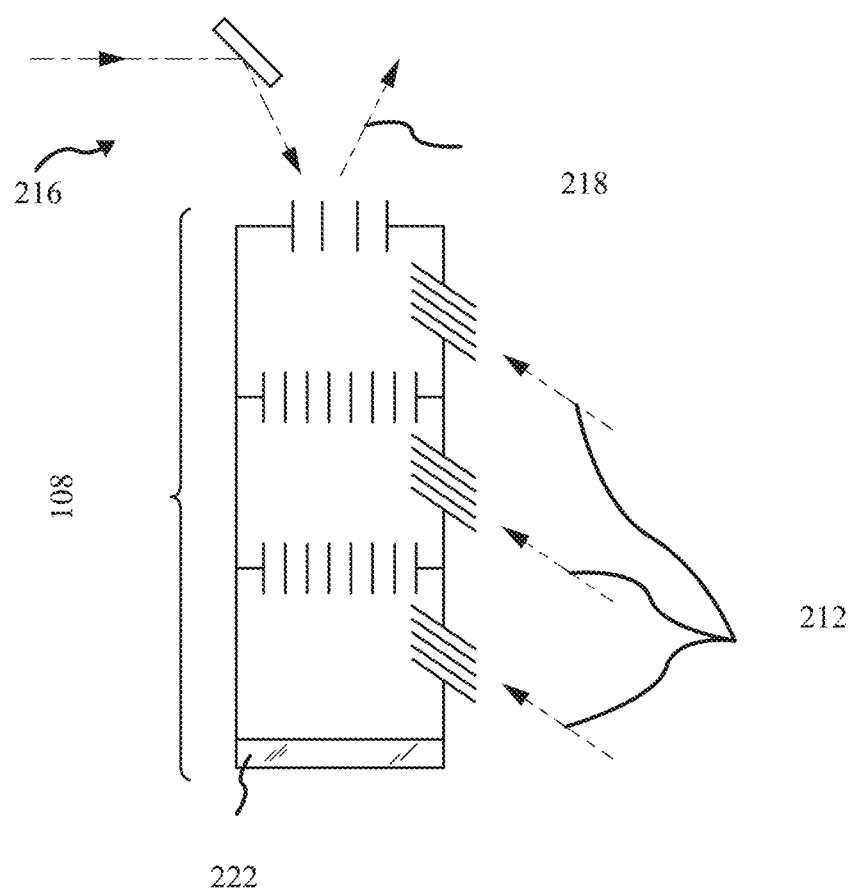
FIG. 13 shows Active Time Delay Mirror [108] utilizing 2-pass amplification of seed beam by inclusion of reflector module [222] in accordance with various embodiments.

For simplicity, the drivers for each stage may have been displayed as an input to the stage with single pass amplification in the stage. Many variants are possible. The one that entails injection of the input from the direction of the next stage (front injection) may be of interest. Referring to FIG. 13, using a separate injection array with a back mirror, or retroflection from a corner cube, or using scattering, such as with a Brillouin phase conjugate mirror, Reflector Module [222], the input signal may be amplified in two-way passes, or if the stage may not be activated by pumping during the first pass, simply using the front injection path may provide a simplified way of producing the time delays of interest. While the multiple pass amplification approach of single pass stage amplification has a high degree of flexibility, multiple pass injection may also be attractive in terms of gain and potential simplification. FIG. 9 shows front injection for the input seed beam into the Raman Aperture Combiner in accordance with various embodiments. The choice may depend on the desired stage properties. FIG. 10 shows a geometry for back injection into the Fast Compressor using an injection element in accordance with various embodiments.

FIG. 11 shows an embodiment where the target spot array is imaged through a conventional imaging element. This may avoid having to put the entire curvature on a diffractive element and is more flexible in terms of the patterns that may irradiate the target.

A consideration for some embodiments may be stage efficiency. Previously (see, for example, "Optical Pulse Compressor Systems for Laser Fusion," supra, and "Raman Pulse Compression of Excimer Lasers for Application to Laser Fusion," *IEEE Journal of Quantum Electronics*, Vol. QE-15, No. 5, May 1979, pp. 342-368), the compression efficiency versus degree of temporal compression may have been a strong constraint. By combining the time delay function with compression in a given stage (such as the ATDM array), effective single stage compressions of 100 to 1000 may be practicable at high efficiency, for example. By choosing scattering processes based on gaseous media at high fluence, very small optical areas can be realized. For example, obtaining high gain ($\geq 10^3$), high efficiency ($\eta \cong 0.9$), high fluence (~$10^3$ joules/cm$^2$) output with high temporal compression ratios (~10) in the same stage may be taken into consideration for some embodiments. Both Raman and Brillouin scattering are generally nonlinear and have the property that the spontaneous emission rates and consequent amplified spontaneous emission (ASE) as a limitation may be less serious than for linear systems (such as KrF or Nd: glass) in terms of gain length products. This may reduce the degree of stage isolation. The criteria for the scattering media may involve the lower level relaxation times (as related to extraction), the effective coupling coefficient, the nonlinear index, and, in particular, the optical breakdown characteristics. Low pressure (~1 atmosphere) gaseous media (He, Ne, Ar, Kr, Xe, N$_2$, etc.) and mixtures thereof may have a good combination of high breakdown fluence at 0.25-micron wavelength and acceptable scattering characteristics, for example. The ratio of the breakdown fluence, CB, to the extraction saturation fluence $S_b$ ($S_b = 2/\gamma c$), can range approximately from 5 to 100 for certain gas combinations, for example. Since an extracting fluence of $S_b$ or higher may be useful for efficiency of pump conversion, this ratio for the operating conditions of interest may be much larger than 1. Another characteristic may include the absorption of the medium. Transient absorption limits the operation of KrF lasers and for a typical extraction efficiency to 0.5 (see, for example, T. H. Johnson, and A. M. Hunter, "Physics of the krypton fluoride Laser," *Journal of Applied Physics*, Vol. 51, No. 5, pp. 2406-2420, 1980, incorporated by reference herein for all purposes). For the conversion efficiency of 0.9 or higher, the extraction may be much more efficient. Typical operating points for the media of interest here may be at gains of 1-10% cm$^{-1}$. The undisturbed gases here may have low linear absorption and scattering losses (~10$^{-5}$ cm$^{-1}$). Under the irradiation of the ultraviolet extracting beam, the electron, ionic, and excited state densities may rise. In some embodiments, the stages may be operated in a regime where the associated absorptions are on the order of, or less than, 1% of the small signal gain to maintain stage efficiency. For suitability of stage coupling, the degree and control of speckle and diffraction loss may be straightforward to calculate as design considerations. Also, linewidth control and suitability, including multicolor requirements, may be taken into account for each stage. In the last stage that may produce a high quality output tailored to the target, the general issues may shift to obtaining a near diffraction limited output through a transient window or aperture at very high fluence. For the overall layout, the index and/or density matching and propagation path linear index fluctuations may be taken into consideration, to ensure good interstage coupling.

C. Specific Embodiments

Figure 18:
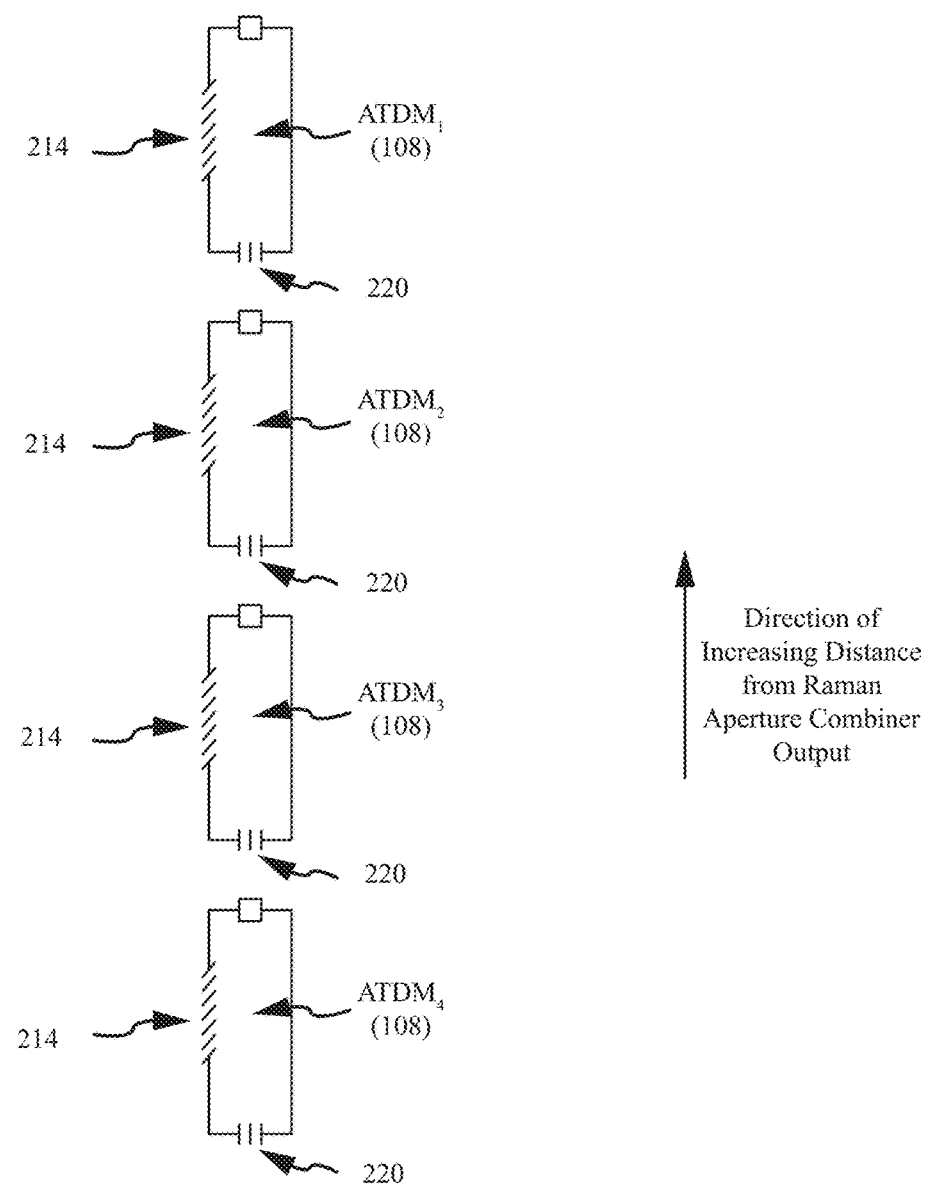
FIG. 18 shows a staggering of 4 Active Time Delay Mirror positions in the down tube direction in accordance with various embodiments.
Figure 19:
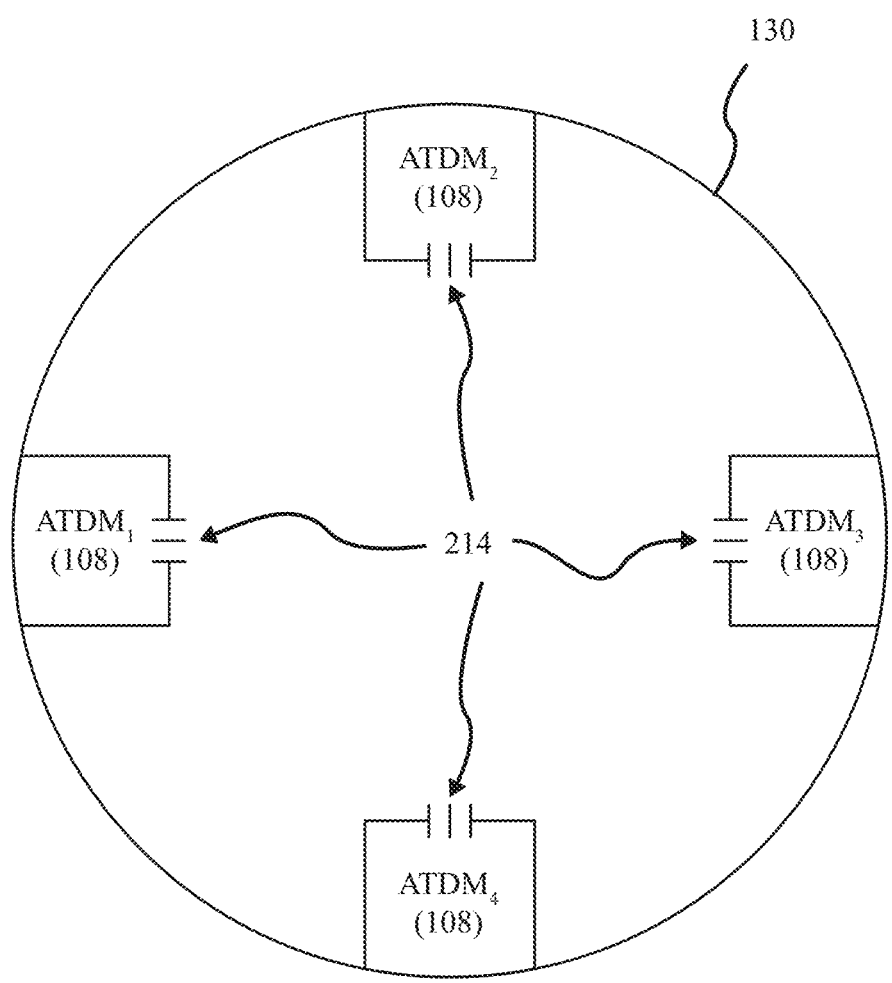
FIG. 19 shows a cross section of the staggering of 4 Active Time Delay Mirror positions in accordance with various embodiments.

The physical description and configuration of an embodiment is outlined in FIG. 1. The dimensions used are for example purposes only. Other embodiments may utilize other values. The laser source may include a Large Pump Module [100] having active laser volume dimensions of 6 meters×6 meters×20 meters, filled with krypton fluoride laser gas (argon, krypton, Fluorine in the partial pressures of 700:58.5:1.5 torr). The large pump module input beams may drive the Large Pump Module [100]. The laser light may emerge onto the Turning Array [102] of segmented ultraviolet reflectors at 0.25-micron wavelength, for example, made of glass substrates with dielectric coatings. From the Turning Array [102], the laser energy may go to the Raman Aperture Combiner [104]. The combiner may be 17 meters long×0.5 meters×0.5 meters and filled with a gas mixture of Raman active gas (krypton, neon, nitrogen, in the partial pressure of 190:167.2:402.8 torr). The propagation region between the Large Pump Module [100] and the Raman Aperture Combiner [104] may be filled with argon at 760 torr. The Rayleigh scattering loss over ~1.5 km is ~35% in argon with a corresponding loss in neon is 2%. Shutters [126] may be utilized to segment the gas in the Raman Aperture Combiner [104] from the gaseous media around it, argon, in this case. The Ambient Environment Enclosure [130, not shown] is 3 meters in diameter with a length of 1,300 meters. Inside the tube may be the Active Time Delay Mirrors [108]. There may be 36 of these mounted inside the tube. Their dimensions may be 12.5 meters long by 0.25× 0.25 meters in cross-section. The optical outputs from the Raman Aperture Combiner [104] may be sequentially addressed in angle to go into the 36 separate entrances to the Active Time Delay Mirror [108]. The Active Time Delay Mirrors [108] may be mounted to the tube of the Time Delay Section [106] and their entrances are spaced 12.5 meters apart down the tube with the exception that two of them may be advanced closer to Raman Aperture Combiner [104] by about 1.25 meters from the reference position, thus the 36 Active Time Delay Mirrors [108] occupy a length of about 450 meters. This staggering of ATDMs [108] is further illustrated, for example, in FIG. 18 showing the displacement of mirrors in the long direction of the tube [130] and in cross section (FIG. 19). Each Active Time Delay Mirrors [108] then introduces a time delay of 83 nanoseconds in reflecting the pulse in a given address channel from the Raman Aperture Combiner [104]. The reflected pulses may be 10 nanoseconds in pulse length, as controlled by the input from the seed pulses of the Backward Raman Mirror Inputs to Active Time Delay Mirrors [118]. The Raman active gas in the Active Time Delay Mirrors [108] may be separated into three sections. The section farthest from the Raman Aperture Combiner [104] may be 1.5 meters long and contains a Raman active gas of krypton:neon:nitrogen (14) in partial pressures of 190:167.2:402.8 torr. The nitrogen (14) refers to N$_2$ gas that is entirely of atomic isotope weight 14. The second section may be 2.5 meters long and contains a Raman active gas krypton:neon:nitrogen (each molecule is $^{14}$N-$^{15}$N):argon in partial pressures 68.4:67.6:152:47.2 torr. The third section (nearest the Raman Aperture Combiner [104]) may be 8.5 meters long and filled with Raman active gas of krypton:neon:nitrogen (15):argon in partial pressure of 22.8:15.2:38:684 torr. The Backward Raman Mirror Inputs to Active Time Delay Mirrors [118] come from the end of the Time Delay Section [106] opposite the Raman Aperture Combiner [104] and form a set of inputs to the Active Time Delay Mirrors [108].

Figure 5:
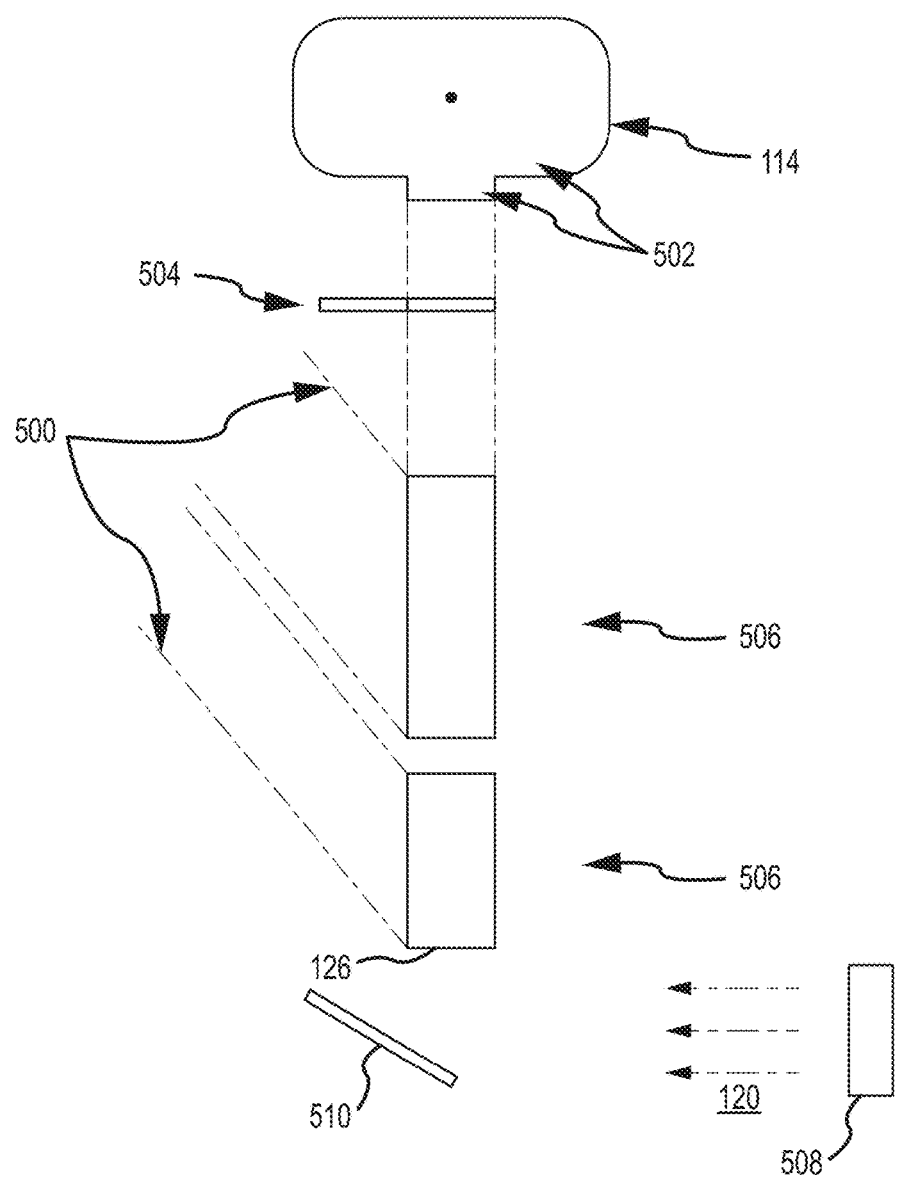
FIG. 5 shows a Backward Brillouin Scattering Cell to combine time-delayed pulses and form a compressed, coherent optical beam in accordance with various embodiments.

The 36 separate channels from the Time Delay Section [106] may go to the Fast Compressor [110]. The Fast Compressor [110] may have a diffractive optic input element with Fast Compressor Input [120] and may include two backward Brillouin scattering sections (FIG. 5). The section closest to the Active Time Delay Mirrors [108] may have dimensions 2 meters long×0.65 meters×0.65 meters and is filled with gas at 1 atmosphere pressure with partial pressures of Helium:Xenon:neon of 534:28:197.6 torr. The second section may be 2 meters long×0.65 meters×0.65 meters and may be filled with gas at 1 atmosphere pressure with partial pressures of Helium:Sulfur Hexafluoride of 638:121 torr that are separated by a shutter. The two channels of the Active Time Delay Mirrors [108] that may be advanced in time and may arrive first at the Fast Compressor may be directed and may be overlapped at the second section (He:SF$_6$). These may be matched to the section by having an expanding input from the Backward Raman Mirror Inputs to Active Time Delay Mirrors [118]. The other 34 channels may be used to pump the first section and may be defocused and overlapped to pump it. The crossing angle between the pump input from the Active Time Delay Mirrors [108] and Fast Compressor Input [120] may be about 160°. The Fast Compressor Input [120] may be a short pulse of 1-2×10$^{19}$ seconds and may be directed into the second section of the Fast Compressor [110] through the first section of the Fast Compressor [110] and then into the Vacuum Transition [112].

First Embodiment

Figure 15:
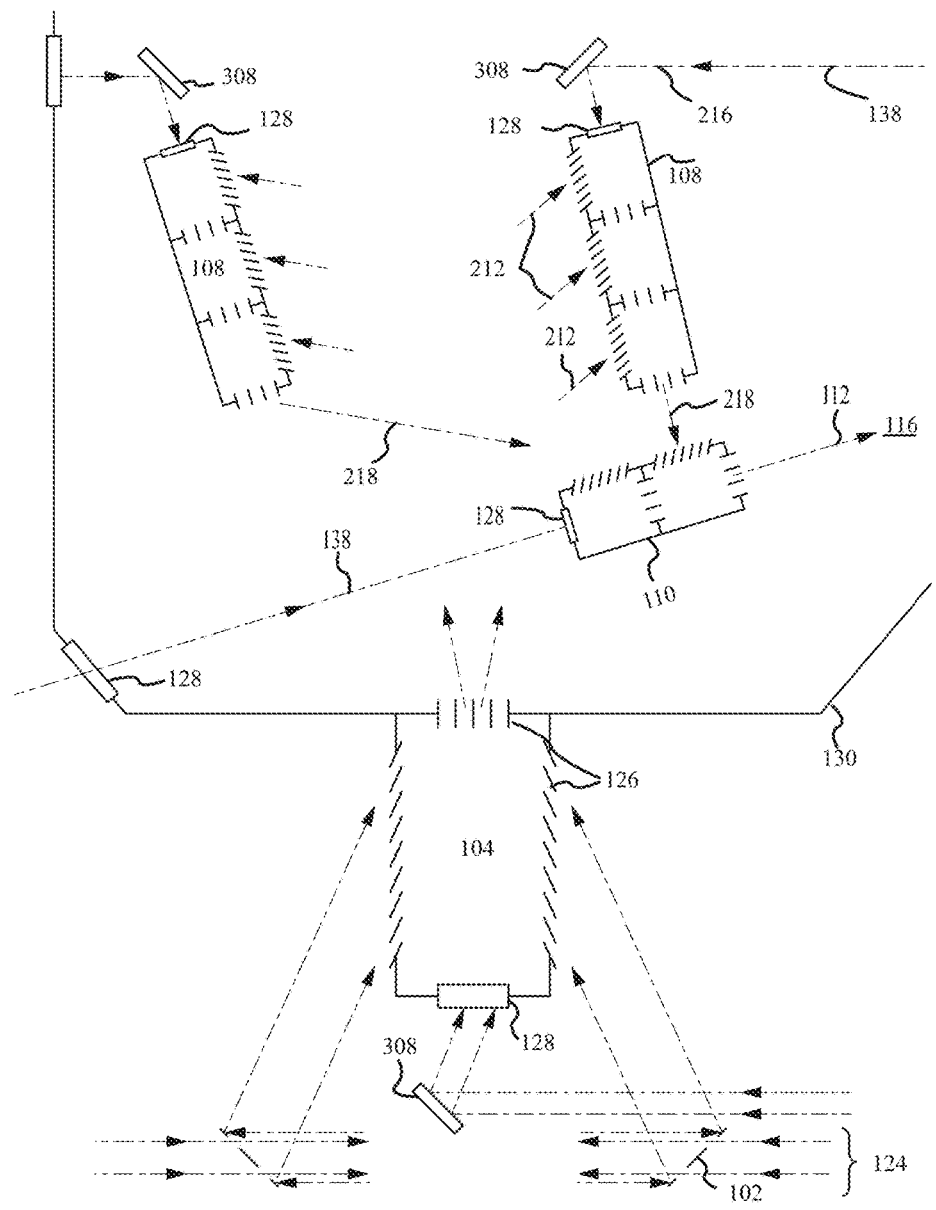
FIG. 15 shows a schematic layout emphasizing different aspects in accordance with various embodiments.

FIG. 14 shows the layout of a first embodiment in a form emphasizing the partition of elements into their operating or ambient environment. Primary Laser Source [134] which may include Large Pump Module [100] and Turning Array [102, not shown] may be located in air as may be all seed laser sources [136] subsequently amplified by the Primary Laser Source, Raman Converter, Time Delay Mirrors or Fast Compressor. Seed laser beam paths may utilize higher optical quality (especially the Fast Compressor inputs), and may be isolated in stable temperature paths separated by an enclosure from ambient air. Some of these seed laser paths could also be enclosed in tubes filled with N$_2$. Inputs to the Raman Aperture Converter [104] may be located in air (shown more clearly as shutters [126] on the Raman Aperture Converter in FIG. 15). FIG. 15 also shows an example of the input to the Raman Aperture Converter (seed laser input) as a window but could also be shutter(s). Returning to FIG. 14, the Active Time Delay Mirrors, Fast Compressor, and/or Vacuum Transition Section [112] may be wholly contained in the Ambient Environment Enclosure [130]. Seed laser beams driving the Active Time Delay Mirrors and the Fast Compressor may enter the Ambient Environment Enclosure through windows [128]. The gas in the Vacuum Transition [112] section may be neon at 760 torr, for example. The pulse from the Fast Compressor [110] may propagate towards the Target [116].

FIG. 2 displays the outputs and/or of the various sections in accordance with various embodiments. Below, the sizing and operation of the various components are described in accordance with the different variations.

In some variations, the Laser Pump Module, such as seen in FIG. 1, generates a long optical pulse that is shown coming out both ends. The optical pulse length in this section may be $3 \times 10^6$ seconds, for example. The beam may emerge collimated as about 400 beamlets per end. The overall blocks of light are shown in FIG. 2. They then may impinge on the two Turning Arrays [102]. These arrays may direct the beamlets into a Raman Aperture Combiner [104]. The optical fluence average over the pump module output for each end is $7.5 \times 10^4$ joules/m$^2$, with areas of 36 m$^2$ for each end, for example. Thus, $5.4 \times 10^6$ joules of pump energy may impinge on the Raman Aperture Combiner [104]. The Raman Aperture Combiner [104] may have output dimensions of 0.5 meter×0.5 meter and is 17.5 meters long. Its overall conversion efficiency may be 0.9 and may use Stimulated Rotational Raman Scattering (SRRS) in $N_2$ as the active mechanism. Thus, the output fluence of the Raman Aperture Combiner [104] may be $1.9 \times 10^7$ joules/m$^2$. The output may be angularly addressed by 36 angularly separated time delay beams amplified from the Raman Aperture Input [122], for example. The overall Raman Aperture Combiner [104] energy gain may be $10^3$; thus, the Raman Aperture Input [122] may have an input energy of $4.5 \times 10^3$ joules total. The input frequency may be offset by the S(6) transition in $N_2$ energy increment from that of the Large Pump Module Input Beams [124]. Thus, the input beams may be lower in photon frequency by an increment of $1.79 \times 10^{12}$ Hz to the pump beams, for example. The bandwidth of the Large Pump Module Input Beams [124] may be $10^9$ Hz, as may be the bandwidth of the Raman Aperture Combiner Input [122] beams, and the centerline frequency of these beams may be set near the peak of the krypton fluoride gain curve at 2,485 Angstroms, for example. The Raman gain coefficient at S(6) for the mixture described may be about 6×10-12 cm/watt (G. C. Herring, and W. K. Bischel, "Model of the Rotational Raman Gain Coefficients for N2 in the Atmosphere," *Applied Optics*, Vol. 26, No. 15, pp. 2988-2994, 1987, incorporated by reference herein for all purposes). The pump power in this converter may be (for a very small crossing angle) about: $5 \times 10^6$ joules/(0.25 m$^2$) ($3 \times 10^{-6}$ seconds)=$6.67 \times 10^{12}$ watts/m$^2$, or $6.67 \times 10^8$ watts/cm$^2$, giving an overall gain of 0.4 m$^{-1}$. For a 17.5 meter converter, for example, the forward small signal gain may then be $e^7 \cong 10^3$. The crossing angle may be adjusted, as well as the gas mixture, to match the pump to the gain parameters. The aspect ratio may be 0.5/17.5 m=0.0286, and the subtended angle may be $8.18 \times 10^{-4}$ steradians. The nitrogen mixture may be contained in the active volume by shutters (transient apertures) that are actuated some 1 second prior to the pulse beginning. Different means of separating the gases may be utilized, including, but not limited to, aerodynamic curtains of buffer gases. Thus, there may be no material windows for the pump or Raman light to pass through at high fluence. Argon may be used as the gas environment for the Raman cell output. It may provide low cost and is not Raman active. The Raman Aperture Combiner Optical Output [202] may be aimed at 36 different Active Time Delay Mirrors [108] spread out over 450 meters in the Time Delay Section [106], for example. Each multiplex channel has an address time of 83 nanoseconds and the switching time between channels may be on the order of a few nanoseconds.

Also, the focal length of the combiner output may be varied to give optimal mirror efficiency. Both the transverse dimensions of the Raman Aperture Combiner [104] and the Active Time Delay Mirrors [108] may be adjusted. If the Active Time Delay Mirrors [108] may be set at the same transverse dimensions as the output of the Raman Aperture Combiner [104], they may have a total area of 9 m$^2$.

Figure 3:
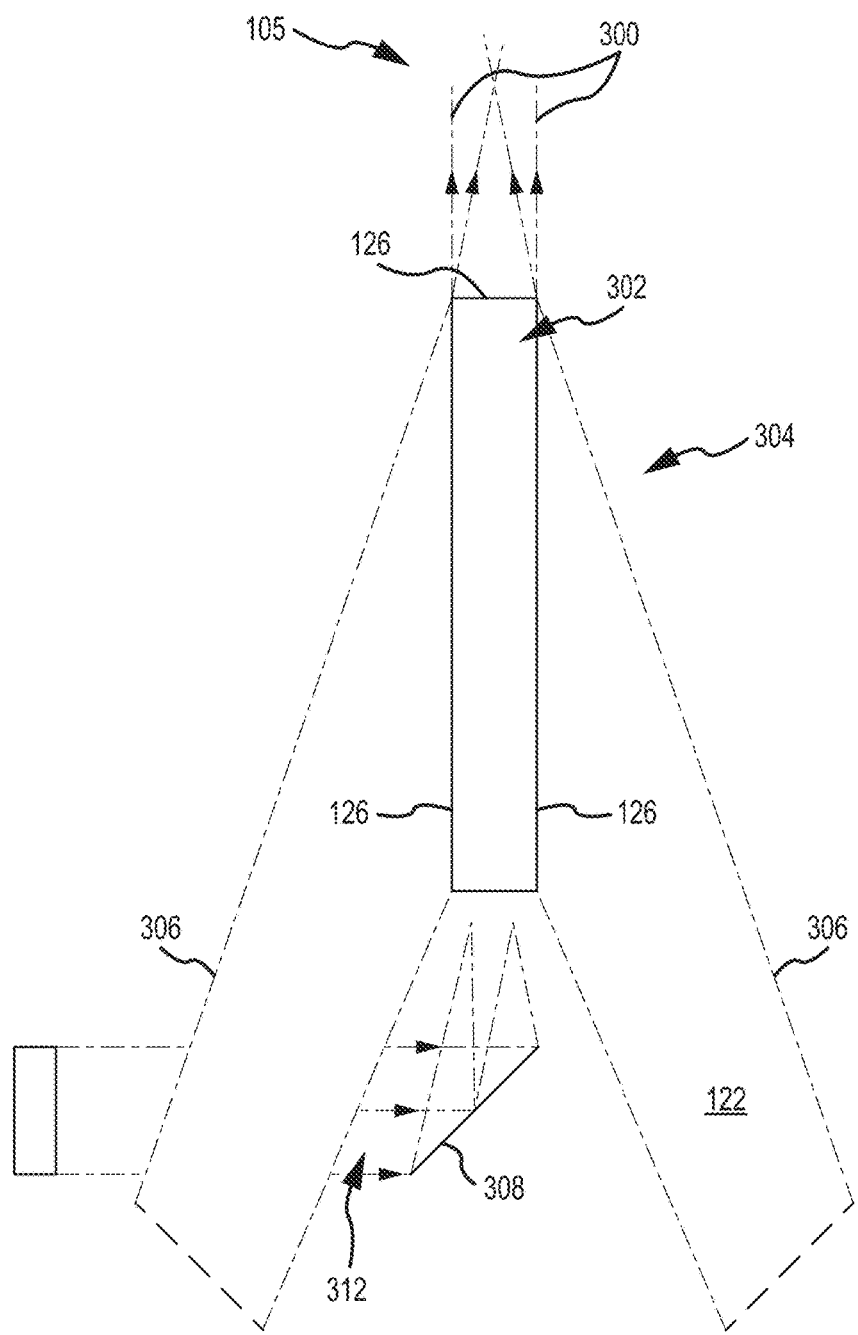
FIG. 3 shows an angular multiplexed forward Raman scattering cell (Raman Aperture Combiner [104]) in accordance with various embodiments.

In one set of variations, three sections for the Active Time Delay Mirrors [108] with a 12.5 meter length overall with the nitrogen isotopic mixtures of $^{14}$N-$^{14}$N(1$^{st}$ section), $^{14}$N-$^{15}$N(2$^{nd}$ section), $^{15}$N-$^{15}$N (3$^{rd}$ section) may be used. The lengths and mixtures may be 1.5 meters $^{14}$N-$^{14}$N (at 0.25/0.22/0.53 by pressure fractions in a krypton/neon/nitrogen mixture), 2.5 meters $^{14}$N-$^{15}$N (at 0.09/0.089/0.20/0.62 pressure fractions in a krypton/neon/nitrogen/argon mixture), and 8.5 meters $^{15}$N-$^{15}$N (at 0.03/0.02/0.05/0.9 pressure fractions in a krypton/neon/nitrogen/argon mixture). The frequency of the Raman Aperture Combiner Optical Output [202] may be changed in time. In this case, there may be three frequencies per time compression channel. The three colors and their timing and shift may be zero frequency shift from the nominal output frequency from the Raman Aperture Combiner [104] of 10 nanoseconds duration for the $^{14}$N-$^{14}$N section, a 2.13 cm$^{-1}$ shift of 16.7 nanoseconds duration for the $^{14}$N-$^{15}$N section, and a 3.93 cm$^{-1}$ shift of 56.7 nanoseconds duration for the $^{15}$N-$^{15}$N section, for example. The Backward Raman Mirror Inputs to Active Time Delay Mirrors [118] may have a frequency shifted by −60 cm$^{-1}$ {the S(6) energy loss in Stokes scattering} from the O shift color from the Raman Aperture Combiner [104]. The three colors may follow one another, with section 1 first, section 2 second, and second 3 third. The total pulse length may be 83.3 nanoseconds, for example. The Raman Aperture Combiner [104] may amplify this pulse format from the Raman Aperture Combiner Input [122] by sequential color addressing of the beams from the Large Pump Module [100], which in turn may be driven by the Large Pump Module Input Beams [124]. Each cycle of 3 colors of the Raman Aperture Combiner [104] may be repeated for each optical multiplex channel. The color addressing to the Raman Aperture Combiner [104] takes into account the various optical delays in the Large Pump Module [100] optical paths and those associated with position of the beams from the Turning Array [102] as they impinge on the Raman Aperture Combiner [104]. Each of the 83 nanosecond angularly multiplexed pulses may then have 3 frequencies (FIG. 3). The mirror gain (ratio of output energy from one of the Active Time Delay Mirrors [108] to one of the Backward Raman Mirror Inputs to Active Time Delay Mirrors [118]) may be about 744, and the input fluence around 1 joule/cm$^2$, for example. The input seed beam to the mirror may have a frequency lower than the unshifted (0 frequency) output from the Raman Combiner by the energy lost for the S(6) transition (60 cm$^{-1}$ or $1.8 \times 10^{12}$ Hz). The above discussion of the Active Time Delay Mirrors [108] is summarized in Table III, and further illustrated in FIG. 15. There, output from the Raman Aperture Combiner [104] destined for ATDM #1 is designated 1 and different variations may be composed of time delayed, frequency, and angle shifted beams 1', 1" and 1'" with properties summarized in Table III and more completely described above, for example.

TABLE III

Summary of Properties of Different Sections of
Active Time Delay Mirrors and their Designations in FIG. 15

| Section | Position relative to RAC | Designation of light in FIG. 15 | Frequency shift $\Delta\upsilon$ | Pulse length $\tau$ | Gas Mix | Length |
|---|---|---|---|---|---|---|
| Low power input | ⇧ | 216 | $-60$ cm$^{-1}$ | 10 nsec | — | — |
| I | ⇧ | 212 or 1''', 2''', ... | $^{Pump}$ 0 cm$^{-1}$ | 10 nsec | $^{14}$N | 1.5 m |
| II | ⇧ | 212 or 1'', 2'', ... | $^{Pump}$ 2.13 cm$^{-1}$ | 16.7 nsec | $^{14}$N, $^{15}$N | 2.5 m |
| III | ⇧ | 212 or 1', 2', ... | $^{Pump}$ 3.93 cm$^{-1}$ | 56.7 nsec | $^{15}$N | 8.5 m |
| Amplified output | ⇧ | 218 or 1*, 2*, ... | $-60$ cm$^{-1}$ | 10 nsec | — | — |

The multiplex beam's individual 83.3 nanosecond pulse length of the Raman Aperture Combiner optical output [202] may now be compressed to about 10 nanoseconds in duration, reflected and defocused, and then propagate through the propagation medium argon and to the Fast Compressor [110], where the individual channels are aimed to overlap in the medium, as described above (2 channels to section 1 of the Fast Compressor [110], 34 channels to section 2 of the Fast Compressor [110]), for example. The optical power may now be about $3.94\times10^6$ joules/($10^{-8}$ seconds)($4.2\times10^3$ cm$^2$) or $9.3\times10^{10}$ watts/cm$^2$, comparable to the argon breakdown threshold of $6\times10^{10}$ watts/cm$^2$ for a compression section of dimensions 0.65 m×0.65 m. The exact dimensions and fluences may be adjusted to avoid breakdown if it is deleterious to propagation. All of the parameters above are provided for example purposes. Other parameter values and/or ranges may be utilized.

The Fast Compressor [110] may have separate sections for amplification of the Fast Compressor Input [120]. There may be three main types of Fast Compression sections. In some variations, index matching the different sections may be utilized to generate very good beam quality. Furthermore, the Vacuum Transition section may be filled with Helium and/or neon, but other gases are possible, as the gas requires high-level breakdown characteristics. The Fast Compressor optical output may converge as it propagates to the Vacuum Transition [112] and the Target [116]. Since the limitation on injected fluence at 1 nanosecond pulse length and 0.25 microns wavelength may be about 1 joule/cm$^2$ and output fluences of $1-5\times10^3$ joules/cm$^2$ may be desired, the overall gain may be about $1-5\times10^3$. The output from the Active Time Delay Mirrors [108] may be aimed to shape the pump fluence on these separate Fast Compressor sections. By varying the gas mixture concentrations and constituents in each section, the saturation, gain, and breakdown characteristics may be tailored. There may be a two-section backward Brillouin amplifier (FIG. 5) for the Fast Compressor [110] that is index matched to a neon-filled Vacuum Transition [112]. The parameters of the two sections of the Fast Compressor [110, FIG. 5] are given in Table IV, for illustration purposes.

TABLE IV

Two Sections of the Fast Compressor [110]

| PARAMETER NAME | PARAMETER SYMBOL & (UNIT) | SECTION 1 | SECTION 2 |
|---|---|---|---|
| Coupling Constant | $\gamma$ (cm/watt) | $1.6\times10^{-11}$ | $6.63\times10^{-13}$ |
| Gas Concentrations | 1 atmosphere | SF$_6$/He = .16/.94 | He/Xe/Ne = .7/.04/.26 |
| Dimensions of Section Aperture | D (meters) | .65 × .65 | .65 × .65 |
| Output Fluence | $\varepsilon_{out}$ (joules/cm$^2$) | 10 | $10^3$ |
| Input Fluence | $\varepsilon_{in}$ (joules/cm$^2$) | .1 | 10 |
| Saturation Fluence | $S_b$ (joules/cm$^2$) | 4.17 | $10^2$ |
| Pump Flux | $I_p$ (watts/cm$^2$) | $4.2\times10^9$ | $10^{11}$ |
| Length of Compression Section | L (meters) | 1.5 | 1.5 |
| Pump Pulse Length | $\tau_p$ (seconds) | $10^{-8}$ | $10^{-8}$ |
| Overall Gain Parameter | $G=\gamma I_p L$(nepers) | 10 | 10 |
| Index of Refraction | n−1 | $6.25\times10^5$ | $6.25\times10^5$ |
| Breakdown Fluence | $\varepsilon_{breakdown}$ (joules/cm$^2$) | $10^3$ | $10^4$ |
| Section Efficiency | $\eta$ | .8 | .9 |
| Stage Gain | $G_s$ | $10^2$ | $10^2$ |

The first stage may be driven by an aggregate energy of about $2\times10^5$ joules, or two of the 36 channels from the Active Time Delay Mirrors [108], for example. The delay time may be adjusted so that their energy arrives about 10 nanoseconds earlier than the 34-channel pulse, for example. The main pulse from the remaining 34 channels may be configured to arrive at section 2. The two channels may arrive and may be spatially overlapped at section 1 and irradiate a 0.65×0.65 meter area, with a 10 nanosecond pulse length and nominal 42 joule/cm$^2$ pump pulse fluence, for example. Thus, they may be defocused and overlapped as they propagate toward section 1. The 34 channels that impinge on section 2 may also both be overlapped and/or defocused. This may greatly reduce irradiance fluctuations. The propagation tube optical property requirements may be relaxed from diffraction limited and, since the average pump fluence onto section 2 is about $10^3$ joules/cm$^2$, for example, argon gas can be used for the propagation medium in the Time Delay Section [106].

Backward Brillouin scattering may be used in these two sections of the Fast Compressor Input [120, FIG. 5] since the scattering line width is about $10^{10}$ Hz, corresponding to a lower state relaxation time of $10^{-10}$ seconds at atmospheric pressure, and the lower state (acoustic fluctuations) that won't bottleneck during the 1-2×$10^{-9}$ seconds extracting laser pulse. The calculations in Table III are based on a single color pump and extraction line. The system can be run multiline pump by allocating a certain number of mirrors to one color and the remaining mirror channels to other color (s). This is accomplished by changing the Raman Aperture Combiner [104] output frequencies and color coding (FIG. 3), Backward Raman Mirror Inputs to Active Time Delay Mirrors [118], Active Time Delay Mirrors [108], and/or the mirror scattering media. Changing the gas concentrations and types can be used to get the coupling constant to run multiline. Multiline extraction for a single frequency pump may be achieved by multiline injection of seed laser beams into the Fast Compressor. The mixtures in the Fast Compressor [110, FIG. 5] shown in Table III are index matched to a neon inert gas transition section. The number of stages, types and mixtures of gases, pump parameters, etc., may be varied to optimize the performance. In addition, the breakdown due to two photon absorption properties of the medium may be well characterized to arrive at an optimum design. The design shown has an overall gain approaching $10^4$, may be near diffraction limited in terms of beam quality, and may work well at a reasonable crossing angle (in this case, $\theta_c \gtrsim 160°$). The phase matching conditions for backward Brillouin scattering may be represented as:

$$\Delta\Theta \leq \left(\frac{\Gamma}{\omega_Q}\right)^{1/2}$$

(See, for example, M. J. Damzen and H. Hutchinson, "Laser Pulse Compression by Stimulated Brillouin Scattering in Tapered Waveguides," *IEEE Journal of Quantum Electronics*," Vol. QE-19, No. 1, pp. 7-14, 1983, incorporated by reference herein for all purposes). $\Gamma$ here is $10^{10}$ Hz, $\omega_Q \cong 5\times 10^{11}$ radians/sec. Thus, $\Delta\Theta \leq 0.4$ radians, and the angular spread of the pump beams is $10^{-2}$ radians. Other variations of the Fast Compression stage include multisection Raman configurations. Using nitrogen scattering, the coupling parameter may be index matched to a neon transition section. The non-zero nitrogen rotational relaxation time may lead to a more complicated transient extraction situation, with the possibility of running very broadband by using scattering from S(6) to S(12) or higher as the rotational manifold is shifted to very high J values during the extraction process.

Some variations produce an array of 100 micron diameter spots at 300-500 meters from the diffractive optic. The input signal array to the Fast Compressor may be constructed and assembled so that sections of certain transverse dimensions are coherent. In this case, for example, with a 40 meter focal length and 90% of the light inside a 100 micron diameter spot, then, $3\lambda/D_c$ f$\cong$spot size and the coherent diameter criterion is $D_c \gtrsim 0.3$ m. Some variations may generate many target radiance patterns. Simple lenses and diffractive optics may provide two ways of generating such patterns. Some variations generate a particular array. In addition, the pulse may be temporally shaped as well.

The diffractive element may be four sections of 0.3 meter square dimensions. Each section may be 16 phase steps etched in a transparent fused silica plate, formed by lithographic semiconductor reticle techniques, to generate the full array [100]. Target holes [226] from each section, hence, may overlay the separate sections on the whole array irradiated by this beamline. Each target hole [226] may receive light from all four sections. This may result in better intensity averaging properties.

The pattern to be formed may be generated before the Fast Compressor [110] by passage through a phase plate pattern [224, FIG. 14] that will give the desired focal pattern. The optical fluence at the vacuum interface may be about $4\times10^6$ joules/$10^3$ cm$^2 \approx 4\times10^3$ joules/cm$^2$. For example, this may be well below the Helium or neon breakdown fluence of approximately $5\times10^4$ joules/cm$^2$ (see, for example, M. J. Damzen and H. Hutchinson, "Laser Pulse Compression by Stimulated Brillouin Scattering in Tapered Waveguides," supra). The support structure and transition material may be estimated to be in excess of 90% efficient, for example. This may lead to a Fast Compressor and Transition Section design at the particular values given above. Separate beamlines may be added in parallel for multiple beamline irradiation to give the total desired energy. For example, eight beamlines may yield $2.62\times10^7$ joules on target, for example. The above variation employs pressure-matched fast mechanical shutters (Transient Apertures [126]) for separating all the gas regions. Since near diffraction limited beam quality may be desired only in the Fast Compressor [110], the use of such techniques may be straightforward in all but the Fast Compressor stage. Adaptive optics may be utilized to compensate for phase distortions due to stage interfaces. The provision of the front-end beam levels (Seed Laser Sources [136]) with the described temporal and frequency control for the lookthrough elements may be within the practice of skilled practitioners of the art.

Depending on the design parameters, any of the noble gases Helium, neon, argon, krypton, and Xenon may be used where a single gas is specified. For the Raman scatterers, many molecular species, such as $O_2$, CO, etc., may be utilized, as well as $N_2$. These include scattering off vibrational and electronic degrees of freedom as well as rotational.

The operating pressure was chosen to be 1 atmosphere for convenience for some variations. Other pressures may be utilized. The various sections may be separately and jointly optimized and material windows may be used for the pump entrance to a stage, and to separate the sections, if damage levels permit.

In terms of the scattering processes, backward and forward Raman may be utilized in the Fast Compressor [110] as well as backward Brillouin. Different scattering processes may be employed in different sections, including forward Brillouin.

Second Embodiment

Figure 6:
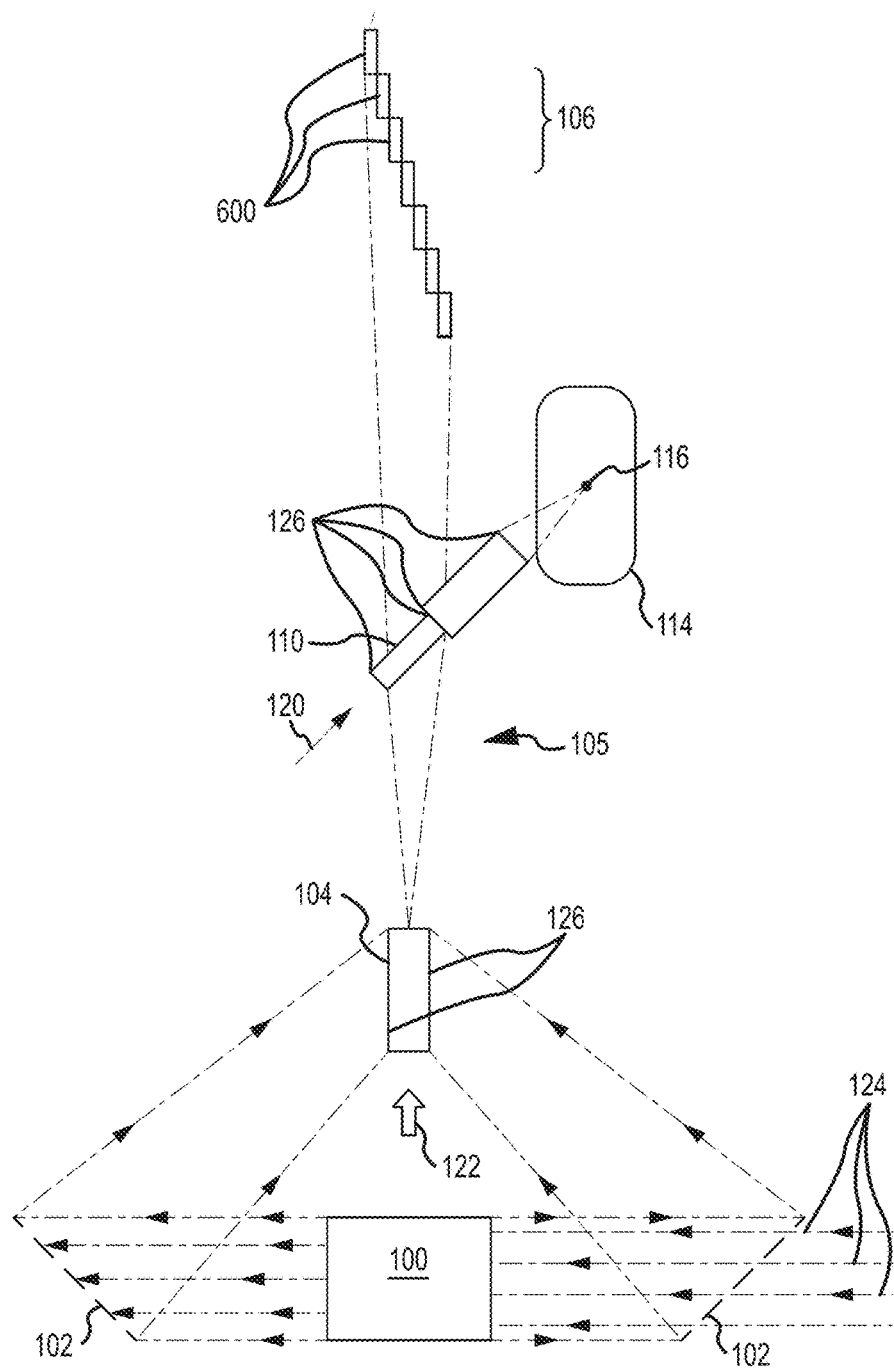
FIG. 6 illustrates an embodiment of the optical arrangement for using material mirrors for multiplexed compression elements in accordance with various embodiments.
Figure 16:
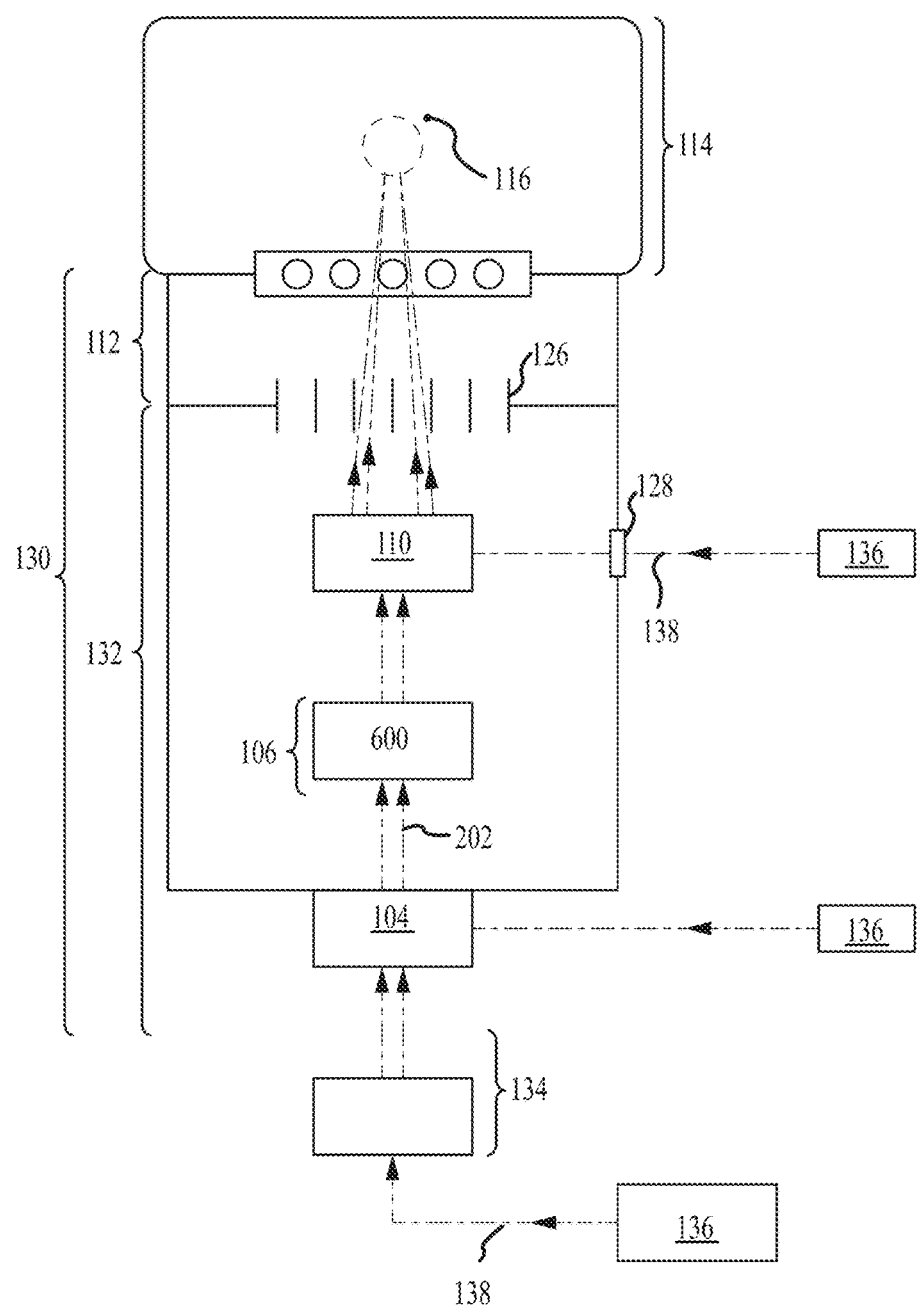
FIG. 16 shows a configuration utilizing High Fluence Material Mirrors within the Time Delay Section in accordance with various embodiments.

In FIGS. 6 and 16, High Fluence Material Mirrors [600] are used in the Time Delay Section [106]. The energy and overall pulse length parameters of the Large Pump Module [100] and the Raman Aperture Combiner [104] may be the same as in the exemplary embodiment. The Raman Aperture Combiner Optical Output [202] may be altered to match this type of mirror. The number of compression channels may be increased to 130, for example. The Raman Aperture Combiner Optical Output [202] fluence is $1.8\times10^7$ joules/m$^2$, with a total energy of $4.5\times10^6$ joules. The size of the High Fluence Material Mirrors [600] may be 0.5 m×0.5 m for a total area of 32.5 m², for example. This may give an average mirror fluence of 1.38×10⁵ joules/m², or, 13.8 joules/cm² for a 2.3×10⁷ second pulse length. Table II, based on "High Damage Threshold $Al_2O_3/SiO_2$ Coatings for Excimer Lasers," supra, may give high reflectivity mirror coating damage levels of 13 joules/cm² and 27 joules/cm² for fresh and conditioned halide coatings. It may give 10-15 joules/cm² for $SiO_2/Al_2O_3$ coatings for a 15×10⁻⁹ second pulse length. At 23×10⁻⁹ second, and a fluence scaling with pulse length of $\tau_p^3$, as may be characteristic of such coatings, an enhancement factor of 1.14 may give damage levels bounded by 11.1 joules/cm² and 30.8 joules/cm², for example. The exact design fluence depend on a specific coating and the details of the intensity patterns on the optical elements. To match the output at 1:1 in size from the Raman Aperture Combiner [104] to the Active Time Delay Mirrors [108], an average fluence on the Active Time Delay Mirrors [108] of 13.8 joules/cm² may be indicated in some embodiments. This may simplify the optics design and manufacturing. This design embodiment point may entail a Time Delay Section [106] output footprint of about 6 meters×6 meters. The compressed beam may then be incident on the Fast Compressor [110]. It may be modified, in terms of coupling coefficient, to run at the 23 nanoseconds instead of 10 nanoseconds pulse length, for example. A Raman medium scattering, such as nitrogen, in the Fast Compressor [110] may now be used if the cells are substantially larger physically and hence, rotational relaxation may not be a major consideration. Additional beam handling optics may be provided to match into the Fast Compressor [110]. This embodiment has modest fluences on material surfaces at the 10⁻⁸-10⁻⁷ second pulse length range, but much higher fluence in the Fast Compressor [110] and Vacuum Transition [112] where there are no permanent surfaces exposed to high optical fluence. The efficiency of the reflectors may be high (reflectivity <~0.95⁺), but the optical area is substantially larger than in the exemplary embodiment. Overall, this embodiment may deliver 3.6×10⁶ joules at the particular design point per beamline in a 2×10⁻⁹ second pulse. The optical area per unit energy delivered here is approximately 10⁻² that of comparable glass systems.

Third Embodiment

FIGS. 7 and 9 are based on a direct high compression arrangement. This embodiment has a high fluence propagation through a helium and/or neon gas in the Time Delay Section [106] and can operate at very high fluence. Some embodiments have the number of time multiplexing channels at 10², and the Active Time Delay Mirrors [108] compression ratio is 15, giving a 2×10⁻⁹ second pulse onto target. To facilitate optical performance, one can make the Backward Raman Mirror Inputs to Active Time Delay Mirrors [118] phase coherent with adaptive optics. The target pattern can be phase impressed in the low power region before the Active Time Delay Mirrors [108]. This may deliver 3.6×10⁶ joules to the target per beamline, for example. This embodiment is very compact, and has few elements. Note that the Fast Compressor [110] may be eliminated.

Fourth Embodiment

Figure 17:
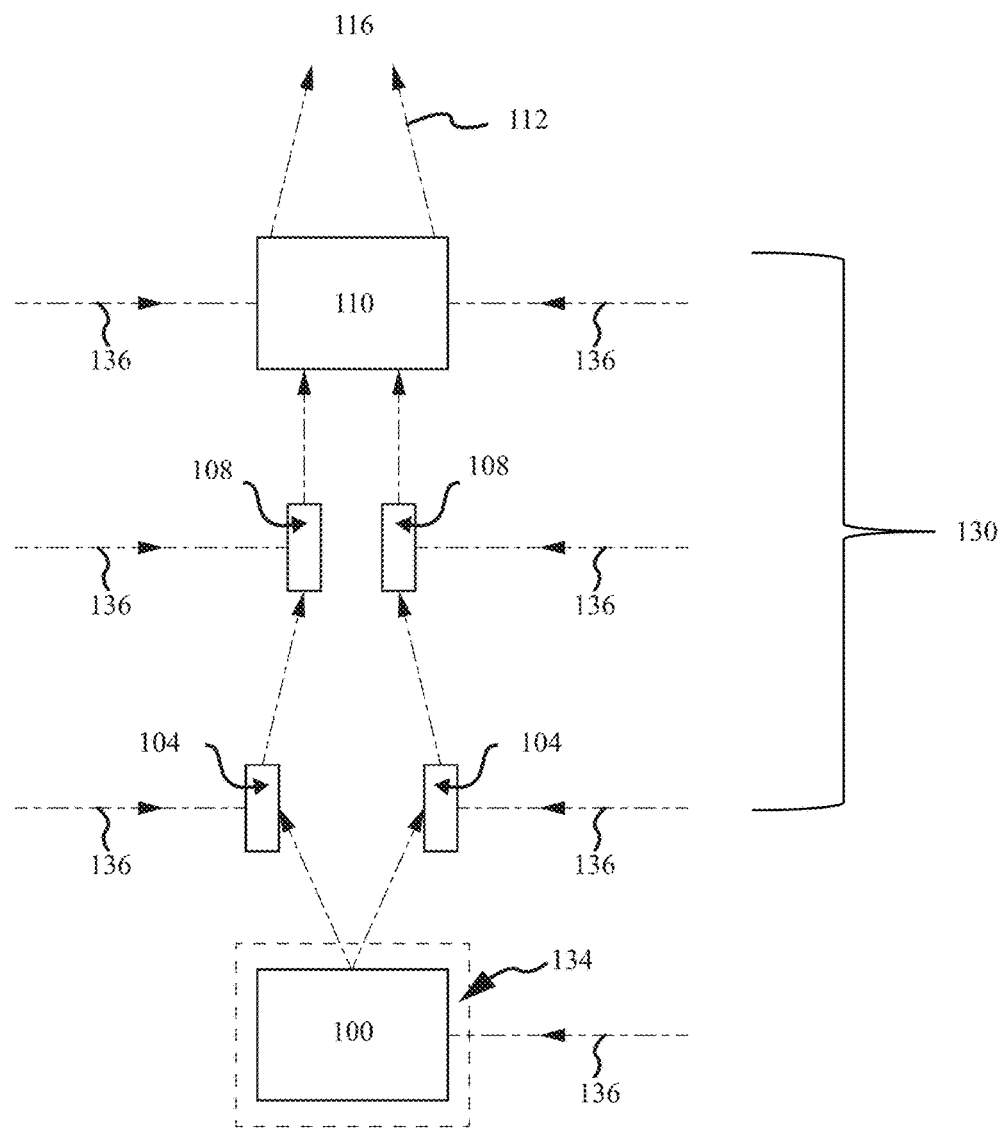
FIG. 17 shows a configuration utilizing multiple Raman Aperture Combiners to drive the Active Time Delay Mirrors in accordance with various embodiments.

In FIGS. 8 and 17 a fourth embodiment is shown with a Fast Compressor [110]. Also, it may illustrate the use of multiple Raman Aperture Combiners [104] to drive the Active Time Delay Mirrors [108]. This may permit decoupling the Fast Compressor beam quality from the pump beam quality. To achieve this, the bandwidth of the pump beam may be kept below that of the scattering process. For example, in the first embodiment, the Raman Aperture Combiner [104] output bandwidth at a given color can be <10⁹ Hz, since the nitrogen line width is some 3×10⁹ Hz. This may lead to very high optical quality required only for a bounded and controlled gas region in the Fast Compressor [110] and Vacuum Transition [112]. These embodiments reduce the optical area for windows and reflectors. Since the Vacuum Transition [112] fluence and Fast Compressor [110] fluence may be on the order of 10⁷ joules/m² for the exemplary embodiment, the optical area may be reduced by a factor of about 10³ compared to conventional storage and compression layouts that have many surfaces at about 10⁴ joules/m². This may make large energy, short pulse lasers for ICF commercially viable.

The invention claimed is:

1. An optical pulse compression system comprising: a laser region comprising a primary laser source to generate a multiplicity of independent optical beams; a compression section comprising a plurality of compression stages and an active time delay section, wherein each successive compression stage is directly pumped by the output of the preceding compression stage; a target chamber housing a target within a vacuum; a transient aperture located in a region between said laser region and said target chamber; a plurality of seed lasers arranged to drive the active time delay section and the compression stages; wherein the active time delay section comprises a plurality of mirrors spaced at different distances apart arranged within channels; and wherein each channel of the active time delay section is pumped separately and the output is redirected back towards the next compression stage; and a Raman aperture combiner to spatially compress the primary laser source in a transverse dimension.

2. The system of claim 1, further comprising: a plurality of Raman Aperture Combiners to amplify the pulse format; and wherein the plurality of seed lasers each have different spectral, temporal and wavefront characteristic to drive each mirror differently.

3. The system of claim 2, further comprising:
a vacuum transition section positioned between said compression section and said target chamber;
a vacuum transition aperture positioned between said target chamber and said vacuum transition section; and
wherein said transient aperture temporarily separates the vacuum transition section from said compression section.

4. The system of claim 1, further comprising:
a vacuum transition section positioned between said compression section and said target chamber;
a vacuum transition aperture positioned between said target chamber and said vacuum transition section; and
wherein said transient aperture temporarily separates the vacuum transition section from said compression section.

5. The system of claim 1, further comprising:
a plurality of parallel elements forming each compression stage, wherein each element is driven by a different color from the elements of the previous compression stage.

6. The system of claim 1, further comprising:
a plurality of parallel elements forming each compression stage, wherein each element has a different scattering frequency shift.

7. The system of claim 1, wherein said optical pulse compression system operates at approximately 1 atmosphere gas pressure.

8. A method of optical pulse compression comprising: generating a multiplicity of independent optical beams from a primary laser source of a laser region; receiving said optical beam through a compression section, wherein said compression section comprises a plurality of compression stages and an active time delay section; receiving said optical beam upon a target housed within a vacuum of a target chamber; receiving said optical beam through a transient aperture, wherein said transient aperture is located between the laser region and the target chamber; directly pumping each successive compression stage by the output of the preceding compression stage; driving a plurality of mirrors of the active time delay section and the compression stages with a plurality of seed laser beams; arranging the plurality of mirrors at different distances apart within channels and pumping each channel separately; redirecting the output back towards the next compression stage; and spatially compressing the primary laser source in a transverse dimension.

9. The method of claim 8, further comprising: amplifying the pulse format of a plurality of the optical beam of the primary laser source; driving each of the plurality mirrors at a different spectral, temporal and wavefront characteristic.

10. The method of claim 9, further comprising;
positioning a vacuum transition section between the compression section and the target chamber;
separating the target chamber from the vacuum transition section with a vacuum transition aperture; and
temporarily separating the vacuum transition section from the compression section with a transient aperture.

11. The method of claim 8, further comprising:
positioning a vacuum transition section between the compression section and the target chamber;
separating the target chamber from the vacuum transition section with a vacuum transition aperture; and
temporarily separating the vacuum transition section from the compression section with a transient aperture.

12. The method of claim 8, further comprising:
arranging a plurality of a parallel elements to form each compression stage; and
driving each element by a different color from the elements of the previous compression stage.

13. The method of claim 8, further comprising:
arranging a plurality of a parallel elements to form each compression stage; and
wherein each element has a different scattering frequency shift.

14. The method of claim 8, further comprising:
operating at approximately 1 atmosphere gas pressure.

* * * * *

UNITED STATES PATENT AND TRADEMARK OFFICE
CERTIFICATE OF CORRECTION

PATENT NO. : 10,211,588 B2
APPLICATION NO. : 15/825413
DATED : February 19, 2019
INVENTOR(S) : Robert O. Hunter, Jr.

Page 1 of 1

It is certified that error appears in the above-identified patent and that said Letters Patent is hereby corrected as shown below:

In the Specification

Column 4, under Summary, Line 21, should read, $\approx 10^{-6}$ instead of $\approx 10$, Signed and Sealed this
Third Day of September, 2019

Andrei Iancu
*Director of the United States Patent and Trademark Office*